US012749085B1

(12) United States Patent
Orttung et al.

(10) Patent No.: US 12,749,085 B1
(45) Date of Patent: Sep. 29, 2026

(54) SYSTEM AND METHOD FOR DYNAMIC RESOURCE ALLOCATION AND ARBITRAGE IN PROFESSIONAL SERVICES MARKETPLACE

(71) Applicant: Projectworks Holdings, Inc., San Mateo, CA (US)

(72) Inventors: Mark Orttung, Portola Valley, CA (US); Matthew Hayter, Khandallah (NZ); Robert Lam, San Mateo, CA (US); Kishore Shimikeri, Belmont, CA (US)

(73) Assignee: PROJECTWORKS HOLDINGS, INC., San Mateo, CA (US)

( * ) Notice: Subject to any disclaimer, the term of this patent is extended or adjusted under 35 U.S.C. 154(b) by 0 days.

(21) Appl. No.: 19/277,217

(22) Filed: Jul. 22, 2025

(51) Int. Cl.
*G06Q 30/0202* (2023.01)
*G06Q 10/087* (2023.01)
*G06Q 50/18* (2012.01)

(52) U.S. Cl.
CPC . *G06Q 30/02022* (2025.08); *G06Q 10/08726* (2025.08); *G06Q 50/188* (2013.01)

(58) Field of Classification Search
None
See application file for complete search history.

(56) References Cited

U.S. PATENT DOCUMENTS 10,318,896 B1 * 6/2019 Sarkar ................ G06Q 10/0631
2022/0198562 A1 * 6/2022 Cella ...................... G06Q 40/04
(Continued)

FOREIGN PATENT DOCUMENTS

JP 2022506459 A * 1/2022 ............ G06Q 40/03

OTHER PUBLICATIONS

Jian Pei, A Survey on Data Pricing: from Economics to Data Science, Dec. 1, 2020, IEEE Transactions on Knowledge and Data Engineering, 2021 (Year: 2020).*

*Primary Examiner* — Jerry O'Connor
*Assistant Examiner* — Matthew H Divelbiss
(74) *Attorney, Agent, or Firm* — GALVIN PATENT LAW LLC; Brian R. Galvin

(57) ABSTRACT

A system and method for dynamic resource arbitrage in a marketplace platform that connects multiple service provider organizations. The system collects real-time resource utilization data from participating organizations and processes this data to identify resource imbalances and generate demand forecasts. A semantic matching engine analyzes resource profiles and requirements using high-dimensional vector embeddings to identify optimal pairings between resource requests and available capacity, enabling conceptual understanding beyond traditional keyword-based approaches. The system applies organizational and individual preference criteria through multi-criteria optimization algorithms while maintaining secure data isolation between participants. Automated transaction processing facilitates resource exchanges through escrow services and contract generation. The platform continuously learns from transaction outcomes to improve matching accuracy and includes quality assessment capabilities for credential validation and performance scoring. The system addresses technical challenges in resource optimization across multiple organizations while maintaining service quality standards and enabling efficient marketplace operations.

20 Claims, 17 Drawing Sheets

(56) References Cited

U.S. PATENT DOCUMENTS

| | | | | |
|---|---|---|---|---|
| 2025/0258708 | A1* | 8/2025 | Crabtree | G06F 9/5027 |
| 2025/0259144 | A1* | 8/2025 | Crabtree | G06Q 30/0601 |
| 2025/0265645 | A1* | 8/2025 | Albero | G06Q 40/04 |

* cited by examiner

SYSTEM AND METHOD FOR DYNAMIC RESOURCE ALLOCATION AND ARBITRAGE IN PROFESSIONAL SERVICES MARKETPLACE

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of professional services resource management, and more particularly to a dynamic marketplace platform that enables consulting firms and service providers to optimize resource allocation through real-time arbitrage of professional talent across multiple organizations.

Discussion of the State of the Art

Service providers (e.g., professional services firms), particularly consulting organizations, face significant challenges in balancing business growth with appropriate team scaling. Traditional resource management approaches suffer from several technical and operational limitations: temporal misalignment wherein new client acquisition and resource acquisition operate on different timescales, creating systematic resource imbalances; information asymmetry wherein organizations lack visibility into external resource availability and capacity across the broader market; static resource planning wherein existing systems fail to dynamically adjust to real-time demand fluctuations and market conditions; and inefficient resource utilization wherein underutilized resources represent significant financial loss while other organizations simultaneously experience resource shortages that could be addressed through marketplace-mediated resource sharing.

Current enterprise resource planning (ERP) and project management systems fail to address the dynamic, inter-organizational nature of resource optimization in service provider markets. Existing solutions focus primarily on internal resource management within single organizations and lack the technical infrastructure necessary for secure, real-time resource arbitrage across multiple participating organizations. These systems typically rely on keyword-based matching approaches that cannot effectively identify conceptual alignment between resource capabilities and requirements, resulting in suboptimal resource allocation decisions and missed opportunities for mutually beneficial resource sharing arrangements.

Additionally, conventional resource management platforms lack sophisticated preference management capabilities that can accommodate complex organizational vendor relationships, individual resource preferences, and multi-criteria optimization requirements while maintaining data security and isolation between competing organizations. The absence of automated quality assessment and continuous learning mechanisms further limits the effectiveness of existing approaches in maintaining service quality standards and improving matching accuracy over time.

What is needed is a system and method for dynamic resource arbitrage that enables secure, real-time resource sharing across multiple service provider organizations through intelligent semantic matching, automated preference management, and continuous learning optimization while maintaining organizational data isolation and service quality standards through comprehensive vetting and performance monitoring capabilities.

SUMMARY OF THE INVENTION

Accordingly, the inventor has conceived and reduced to practice, a system and method for dynamic resource arbitrage in a marketplace platform that connects multiple service provider organizations. The system collects real-time resource utilization data from participating organizations and processes this data to identify resource imbalances and generate demand forecasts. A semantic matching engine analyzes resource profiles and requirements using high-dimensional vector embeddings to identify optimal pairings between resource requests and available capacity, enabling conceptual understanding beyond traditional keyword-based approaches. The system applies organizational and individual preference criteria through multi-criteria optimization algorithms while maintaining secure data isolation between participants. Automated transaction processing facilitates resource exchanges through escrow services and contract generation. The platform continuously learns from transaction outcomes to improve matching accuracy and includes quality assessment capabilities for credential validation and performance scoring. The system addresses technical challenges in resource optimization across multiple organizations while maintaining service quality standards and enabling efficient marketplace operations.

According to a preferred embodiment, a computer-implemented resource arbitrage marketplace system comprising: a processor configured to execute instructions stored in memory; a data collection system that receives resource utilization data from multiple participating service provider organizations; a resource analysis system that: processes the resource utilization data to identify resource imbalances across the participating organizations, and generates demand forecasts for future resource requirements; a matching system that identifies optimal pairings between resource requests and available capacity using semantic analysis of resource profiles and requirement specifications; and a transaction system that facilitates automated resource exchanges between the participating organizations.

According to another preferred embodiment, a computer-implemented method for resource arbitrage in a marketplace comprising the steps of: collecting resource utilization data from multiple participating service provider organizations; processing the resource utilization data to identify resource imbalances across the participating organizations and generating demand forecasts for future resource requirements; identifying optimal pairings between resource requests and available capacity using semantic analysis of resource profiles and requirement specifications; and facilitating automated resource exchanges between the participating organizations.

According to a further aspect, the method includes generating high-dimensional vector embeddings of the resource profiles and requirement specifications and performing similarity calculations on the vector embeddings.

According to a further aspect, the method includes processing the resource utilization data comprising analyzing data across multiple organizational hierarchy levels and generating probability-weighted demand forecasts based on pipeline data and historical conversion patterns.

According to a further aspect, the method includes identifying optimal pairings comprising applying preference criteria including organizational vendor relationships and individual resource preferences to filter potential matches using multi-criteria optimization algorithms.

According to a further aspect, the method includes facilitating automated resource exchanges comprising implementing automated escrow services and generating contracts based on negotiated terms between the participating organizations.

According to a further aspect, the method includes validating resource credentials and maintaining performance scoring based on transaction outcomes.

According to a further aspect, the method includes collecting resource utilization data comprising receiving the data in real-time through standardized communication interfaces.

According to a further aspect, the method includes extracting structured data from unstructured resource descriptions and requirements using natural language processing.

According to a further aspect, the method includes maintaining data isolation between participating organizations while enabling secure information sharing for marketplace operations.

According to a further aspect, the method includes continuously learning from transaction outcomes to improve future matching accuracy.

BRIEF DESCRIPTION OF THE DRAWING FIGURES

DETAILED DESCRIPTION OF THE INVENTION

Figure 1:
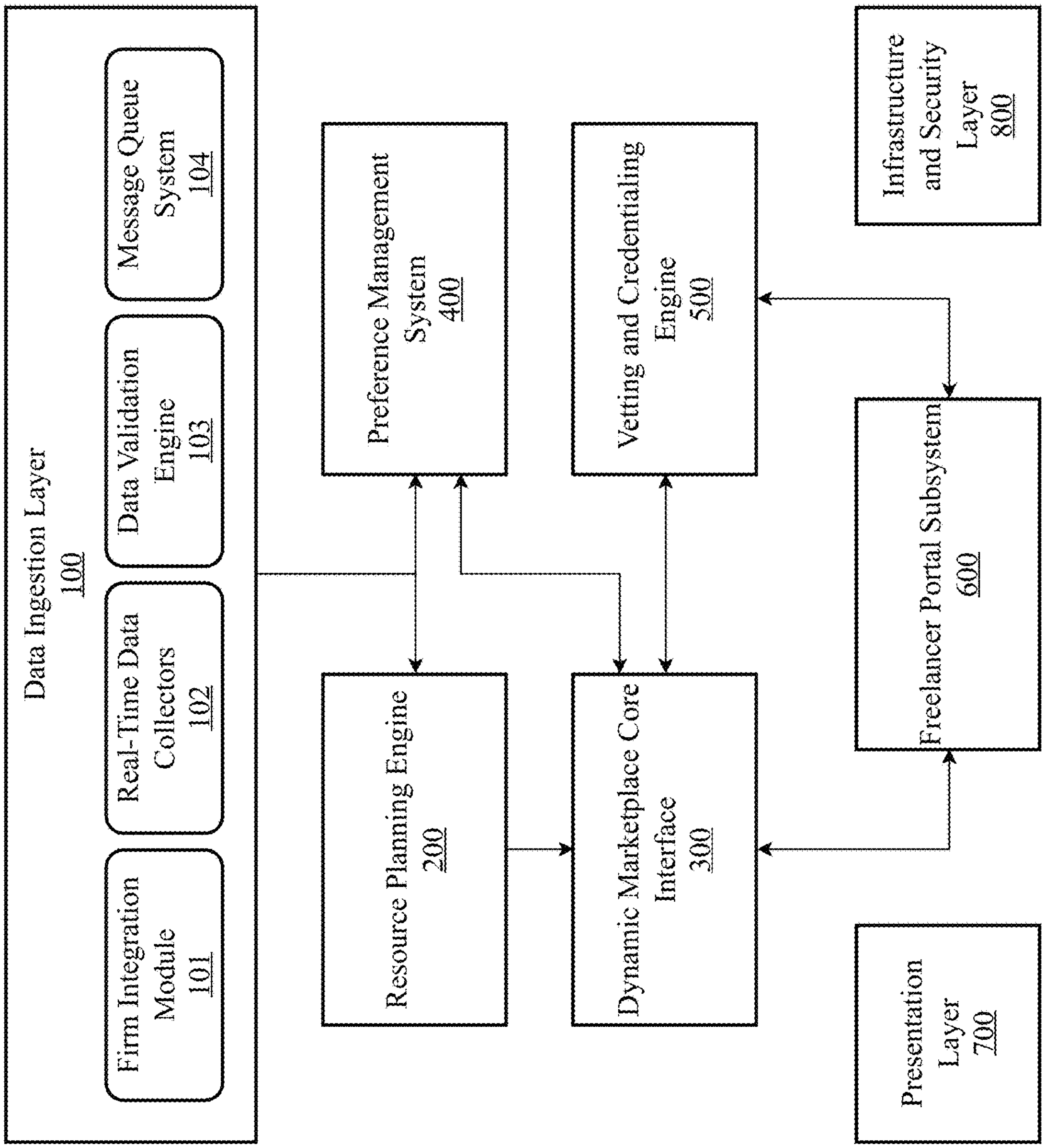
FIG. 1 is a block diagram illustrating an exemplary system architecture for a labor arbitrage marketplace platform, according to an embodiment.

The inventor has conceived, and reduced to practice, a system and method for dynamic resource arbitrage in a marketplace platform that connects multiple service provider organizations. The system collects real-time resource utilization data from participating organizations and processes this data to identify resource imbalances and generate demand forecasts. A semantic matching engine analyzes resource profiles and work history from sources such as comments on time sheets and requirements using high-dimensional vector embeddings to identify optimal pairings between resource requests and available capacity, enabling conceptual understanding beyond traditional keyword-based approaches. The system applies organizational and individual preference criteria through multi-criteria optimization algorithms while maintaining secure data isolation between participants. Automated transaction processing facilitates resource exchanges through escrow services and contract generation. The platform continuously learns from transaction outcomes to improve matching accuracy and includes quality assessment capabilities for credential validation and performance scoring. The system addresses technical challenges in resource optimization across multiple organizations while maintaining service quality standards and enabling efficient marketplace operations.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "labor arbitrage" refers to the automated identification and facilitation of resource imbalances between professional services organizations to optimize consultant utilization and project staffing through marketplace-mediated transactions. For example, when Consulting Firm A has excess data analytics consultants while Consulting Firm B urgently needs such expertise for a client project, the labor arbitrage marketplace can automatically identify this imbalance and facilitate a resource sharing arrangement.

As used herein, "resource arbitrage transaction" refers to a marketplace-facilitated exchange where an overstaffed organization provides consultant resources to an understaffed organization through automated matching, negotiation, and contract execution processes. For example, a transaction where Firm A offers two available Java developers to Firm B for a three-month software implementation project, with automated pricing negotiation and contract generation handled by the marketplace platform.

As used herein, "collaborative fit analysis" refers to the computational assessment of interpersonal compatibility between consultants and client environments using one or more of personality data, communication styles, and historical collaboration patterns to predict engagement success probability. For example, analyzing a consultant's Myers-Briggs profile and communication preferences against a client's organizational culture and team dynamics to determine likelihood of successful project collaboration.

As used herein, "semantic matching engine" refers to an AI-powered system that identifies optimal consultant-project pairings based on contextual understanding and conceptual similarity rather than traditional keyword-based matching approaches. For example, matching a consultant with "enterprise software implementation" experience to a project requiring "large-scale system deployment" even though the exact keywords differ, based on semantic understanding of the relationship between these concepts.

As used herein, "multi-dimensional allocation matrix" refers to a hierarchical resource tracking system that processes allocation data across a plurality of organizational levels including, but not limited to: firm, practice, client, project, team, and individual consultant levels. For example, tracking that Consultant Smith is allocated 60% to the Technology Practice, 40% to Client ABC, specifically on Project XYZ, as part of Team Alpha, while maintaining visibility into firm-wide capacity across all these dimensions simultaneously.

As used herein, "dynamic preference learning" refers to the continuous optimization of matching algorithms through systematic analysis of engagement outcomes and automated adjustment of preference weights to improve future matching accuracy. For example, if projects where clients preferred consultants with startup experience consistently achieve higher satisfaction scores, the system automatically increases the weighting for startup experience in future matching calculations.

As used herein, "vector database system" refers to a specialized database that stores high-dimensional embedding representations of marketplace content to enable semantic similarity search and AI-powered recommendations. For example, storing consultant profiles and project requirements as 1,536-dimensional vectors that capture semantic meaning, allowing the system to find consultants whose experience conceptually aligns with project needs even when described using different terminology.

As used herein, “natural language understanding module” refers to an AI component that processes unstructured professional services content using large language models fine-tuned for consulting industry terminology and context. For example, automatically extracting structured data from a client’s informal project description like “we need help with our digital transformation initiative” to identify specific skill requirements, timeline constraints, and deliverable expectations.

As used herein, “automated vetting process” refers to a comprehensive validation workflow that includes identity verification, background screening, skill assessment, and continuous quality monitoring to ensure marketplace participant qualifications. For example, verifying a consultant’s identity through biometric authentication, conducting criminal background checks, validating technical certifications, and continuously monitoring performance ratings throughout marketplace participation.

As used herein, “multi-tenant data architecture” refers to a system design that maintains strict data isolation between participating organizations while enabling secure marketplace information sharing through tenant-specific encryption and access controls. For example, ensuring that Consulting Firm A’s proprietary client information remains completely isolated from Consulting Firm B’s data while both firms can securely access shared marketplace matching and transaction capabilities.

Conceptual Architecture

FIG. 1 is a block diagram illustrating an exemplary system architecture for a labor arbitrage marketplace platform, according to an embodiment. The system comprises various modular components interconnected through a distributed computing architecture to facilitate dynamic resource allocation and arbitrage among multiple professional services organizations.

A data ingestion layer 100 serves as a primary interface between the labor arbitrage marketplace platform and external professional services firm systems. Data ingestion layer 100 includes a firm integration module 101 configured to establish secure communication channels with existing enterprise resource planning systems, customer relationship management platforms, and project management applications utilized by participating professional services firms. Firm integration module 101 implements standardized communication protocols including REST application programming interfaces (APIs), GraphQL endpoints, and SOAP web services to accommodate diverse firm technology stacks, and maintains secure authentication mechanisms such as OAuth 2.0, API key validation, and certificate-based authentication for data exchange with systems including, for example, SAP, Salesforce, Microsoft Dynamics, Workday, and project management platforms such as Asana, Jira, and Monday.com. Real-time data collectors 102 within data ingestion layer 100 continuously receive resource utilization data, project status information, consultant availability metrics, and organizational capacity parameters from multiple participating firms simultaneously through standardized application programming interfaces and real-time data collection protocols. Real-time data collectors 102 implement streaming data protocols including, but not limited to, Apache Kafka message streams, WebSocket connections, and Server-Sent Events to process data updates, capturing metrics such as billable hours, project milestone completion percentages, consultant skill certifications, and capacity forecasts across multiple concurrent firm connections.

A data validation engine 103 processes incoming data to perform input sanitization, format standardization, and integrity checking to ensure data quality and consistency across multiple firm sources. Data validation engine 103 can be configured to implement schema validation using JSON Schema or XML Schema Definition standards, apply data cleansing algorithms to normalize consultant skill taxonomies and project categorizations, perform referential integrity checks to validate consultant-to-project assignments, and implement anomaly detection algorithms to identify suspicious data patterns such as impossible utilization rates or inconsistent time reporting. A message queue system 104 provides asynchronous processing capabilities for high-volume data ingestion, enabling the system to handle peak data loads without performance degradation. Message queue system 104 utilizes distributed message queuing technologies such as Apache Kafka, RabbitMQ, or Amazon SQS to implement fault-tolerant message processing with configurable retry mechanisms, dead letter queues for failed message handling, and horizontal scaling capabilities to process large data volumes.

A core resource planning engine 200 receives data from data ingestion layer 100 and processes the received information to generate comprehensive resource allocation analyses. Core resource planning engine 200 implements multi-dimensional processing algorithms that evaluate resource allocation across hierarchical organizational structures, including firm-level, practice-level, client-level, project-level, team-level, and individual consultant-level allocations. Core resource planning engine 200 further incorporates temporal processing capabilities that enable analysis of resource allocation patterns across configurable time periods ranging from hourly intervals to multi-month planning horizons. Additionally, core resource planning engine 200 implements predictive modeling algorithms that generate probability-weighted demand forecasts based on potential contract opportunities and historical conversion rates.

A dynamic marketplace core interface 300 operates as a central transaction processing hub of the labor arbitrage marketplace platform. Dynamic marketplace core 300 receives capacity data from core resource planning engine 200 and implements real-time matching algorithms to identify optimal pairings between resource supply and demand across multiple participating organizations. Dynamic marketplace core 300 processes resource requests from understaffed firms and matches these requests against available capacity from overstaffed firms or individual freelance consultants. The matching process may comprise multi-criteria optimization algorithms that consider skill requirements, availability windows, pricing parameters, and quality metrics to generate ranked lists of potential resource matches.

A preference management system 400 maintains and processes relationship data between participating organizations and individual consultants. Preference management system 400 receives organizational preference data from data ingestion layer 100 and implements automated filtering algorithms that prioritize resource matches based on pre-established vendor relationships and individual consultant preferences. Preference management system 400 communicates filtering criteria to dynamic marketplace core 300, enabling the marketplace to present only preferred or pre-vetted resources when processing resource requests from participating firms.

A vetting and credentialing engine 500 implements comprehensive quality assurance protocols for all marketplace participants. Vetting and credentialing engine 500 can be configured to validate participant credentials through automated verification processes, conduct skill assessments, and maintain quality scoring systems based on project outcomes and peer feedback. Vetting and credentialing engine 500 provides validation results to dynamic marketplace core 300, ensuring that only qualified and verified resources are presented for consideration during the matching process.

A freelancer portal subsystem 600 provides a comprehensive interface for independent consultants to participate in the labor arbitrage marketplace. Freelancer portal subsystem 600 enables individual consultants to manage their professional profiles, publish their availability, engage directly with potential clients, and access business management tools. Freelancer portal subsystem 600 communicates bidirectionally with both dynamic marketplace core 300 and vetting and credentialing engine 500 to ensure that freelancer resources are appropriately integrated into the marketplace matching algorithms while maintaining quality standards.

A presentation layer 700 provides user interfaces for all categories of marketplace participants. Presentation layer 700 may implement responsive web applications for firm administrators, mobile applications for consultants, and application programming interfaces for third-party system integrations. Presentation layer 700 communicates with all other system components to present real-time data visualizations, process user interactions, and facilitate marketplace transactions across multiple device types and integration scenarios.

An infrastructure and security layer 800 provides foundational computing services that support all other system components. Infrastructure and security layer 800 implements multi-tenant data architecture with tenant-specific encryption protocols, automated scaling capabilities, comprehensive security monitoring, and regulatory compliance frameworks. Infrastructure and security layer 800 ensures data isolation between participating organizations while enabling the secure sharing of marketplace information necessary for resource arbitrage operations.

The system architecture implements multiple data flow pathways that enable real-time processing of resource arbitrage transactions. Exemplary data flows include transmission of resource utilization data from data ingestion layer 100 to resource planning engine 200, provision of capacity analytics from resource planning engine 200 to dynamic marketplace core 300, and application of preference filters from preference management system 400 to marketplace matching algorithms within dynamic marketplace core 300. Additional data flows include validation of participant credentials by vetting and credentialing engine 500 and presentation of marketplace information through presentation layer 700 to end users across all participant categories.

Figure 2:
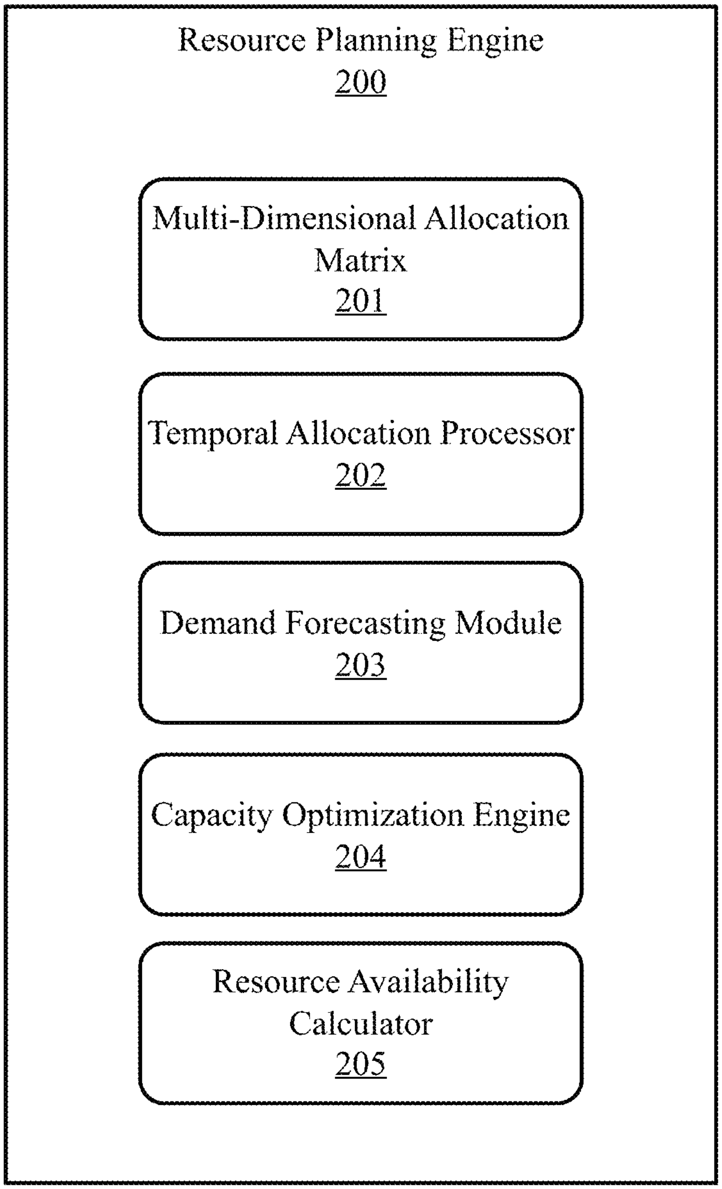
FIG. 2 is a block diagram illustrating an exemplary aspect of the labor arbitrage marketplace platform, a resource planning engine.

FIG. 2 is a block diagram illustrating an exemplary aspect of the labor arbitrage marketplace platform, a resource planning engine. Core resource planning engine 200 comprises one or more specialized processing modules that collectively analyze resource allocation patterns and generate predictive capacity forecasts for participating professional services organizations.

In some embodiments, a multi-dimensional allocation matrix 201 implements hierarchical resource tracking across a plurality of organizational levels to provide comprehensive visibility into resource utilization patterns. Multi-dimensional allocation matrix 201 processes firm-level capacity data including, but not limited to, total employee counts, practice area distributions, and overall utilization rates across multiple business units simultaneously. Multi-dimensional allocation matrix 201 further analyzes practice-level allocations by segmenting resources according to specialized skill domains such as management consulting, technology implementation, financial advisory, and strategic planning practices, calculating utilization metrics and capacity availability for each practice area independently. At client-level granularity, multi-dimensional allocation matrix 201 tracks resource commitments across individual client relationships, monitoring consultant assignments, project durations, and client-specific skill requirements to identify potential conflicts or over-allocations. In some implementations, multi-dimensional allocation matrix 201 implements collaborative fit analysis for client-consultant pairings by processing historical engagement data, communication style compatibility metrics, industry experience alignment, and cultural fit indicators derived from previous project outcomes, client feedback scores, and consultant performance ratings in similar client environments. Project-level tracking within multi-dimensional allocation matrix 201 maintains detailed assignment matrices that correlate specific consultants with active projects, tracking milestone dependencies, deliverable schedules, and project phase requirements to optimize resource deployment while considering team chemistry factors. Team-level analysis within multi-dimensional allocation matrix 201 evaluates collaborative work arrangements, identifies team composition patterns, and monitors inter-consultant dependencies to ensure balanced team formations and skill complementarity.

According to an embodiment, multi-dimensional allocation matrix 201 implements consultant-consultant fit analysis by processing personality assessment data, working style preferences, communication patterns, and historical collaboration success metrics to predict team cohesion and identify optimal consultant pairings that maximize both productivity and job satisfaction. Individual consultant-level processing tracks personal calendars, skill certifications, availability preferences, billable hour targets, professional development activities, and interpersonal collaboration preferences including preferred team sizes, leadership style compatibility, and conflict resolution approaches to maintain granular resource visibility and enable precise allocation decisions that optimize both technical and social aspects of consultant assignments.

A temporal allocation processor 202 enables dynamic time-based resource analysis across configurable planning horizons to accommodate diverse organizational planning cycles. Temporal allocation processor 202 supports hourly granularity tracking for short-term resource optimization, monitoring consultant schedules in real-time to identify immediate availability gaps and enable rapid resource reallocation for urgent client needs. Temporal allocation processor 202 can be configured to process daily allocation patterns to identify recurring utilization trends, consultant productivity cycles, and optimal scheduling arrangements based on historical performance data and individual consultant preferences. Weekly processing capabilities within temporal allocation processor 202 aggregate utilization metrics across seven-day periods, enabling identification of workload distribution patterns, weekend availability requirements, and weekly capacity planning for project deliverables. Monthly analysis functions calculate rolling utilization averages, identify seasonal demand patterns, and generate medium-term capacity forecasts based on historical project cycles and client engagement patterns. In some embodiments, temporal allocation processor 202 implements quarterly planning algorithms that correlate resource allocation with business development cycles, enabling strategic workforce planning aligned with anticipated client acquisition timelines and project pipeline development.

A demand forecasting module 203 may be present and configured to generate probability-weighted predictions of future resource requirements based on sales pipeline analysis and historical conversion patterns. Demand forecasting module 203 may implement machine learning algorithms including linear regression, polynomial regression, and neural network models to analyze historical project data and identify predictive patterns in client acquisition cycles, project scope evolution, and resource requirement fluctuations. Demand forecasting module 203 processes sales pipeline data to assign probability weights to potential contracts based on factors including client engagement history, proposal stage progression, competitive positioning, and historical win rates for similar project types. Demand forecasting module 203 correlates potential contract probabilities with anticipated resource requirements, calculating expected value forecasts that integrate contract likelihood with projected consultant skill needs, project duration estimates, and team size requirements. In some aspects, demand forecasting module 203 implements Monte Carlo simulation algorithms to generate confidence intervals around resource demand predictions, enabling risk-aware capacity planning that accounts for uncertainty in client acquisition timelines and project scope variations.

A capacity optimization engine 204 may be present and configured to analyze current resource utilization patterns to identify optimization opportunities and recommend allocation adjustments. Capacity optimization engine 204 implements real-time utilization monitoring that continuously calculates consultant availability percentages, identifies underutilized resources, and flags potential over-allocation scenarios that could impact service delivery quality. Capacity optimization engine 204 can apply constraint satisfaction algorithms to balance competing resource demands, considering consultant skill compatibility, client preference requirements, project timeline constraints, and individual consultant availability preferences when generating allocation recommendations. Capacity optimization engine 204 can implement bottleneck identification algorithms that analyze resource allocation patterns to identify constraints limiting overall system throughput, such as scarce specialized skills, geographic availability limitations, or consultant capacity constraints in high-demand practice areas. In some embodiments, capacity optimization engine 204 generates rebalancing recommendations that suggest optimal resource reallocations to maximize overall utilization while maintaining service quality standards and consultant satisfaction metrics.

A resource availability calculator 205 maintains real-time calculations of consultant availability considering current commitments, scheduled time off, and projected allocation requirements. Resource availability calculator 205 integrates calendar management systems to track consultant schedules, including, but not limited to, client meetings, internal commitments, training activities, and personal time off requests to maintain accurate availability calculations. Resource availability calculator 205 processes project timeline data to calculate projected consultant availability based on current project commitments, anticipated project completion dates, and expected project scope changes that could impact resource requirements. Resource availability calculator 205 implements conflict detection algorithms that identify potential scheduling conflicts before they occur, flagging situations where consultant commitments exceed available capacity or where project requirements conflict with previously scheduled activities. Resource availability calculator 205 may generate availability forecasts that project consultant capacity across future time periods, enabling proactive resource planning and early identification of potential staffing challenges.

Core resource planning engine 200 implements data processing workflows that enable coordinated analysis across various labor arbitrage marketplace platform processing modules. Multi-dimensional allocation matrix 201 provides foundational resource data to temporal allocation processor 202 for time-based analysis and communicates current allocation status to capacity optimization engine 204 for utilization analysis. Demand forecasting module 203 receives historical allocation data from multi-dimensional allocation matrix 201 and temporal allocation processor 202 to improve prediction accuracy and communicates forecasted requirements to resource availability calculator 205 for future capacity planning. Capacity optimization engine 204 utilizes availability data from resource availability calculator 205 to generate realistic optimization recommendations and provides optimization results to multi-dimensional allocation matrix 201 for allocation updates.

Figure 3:
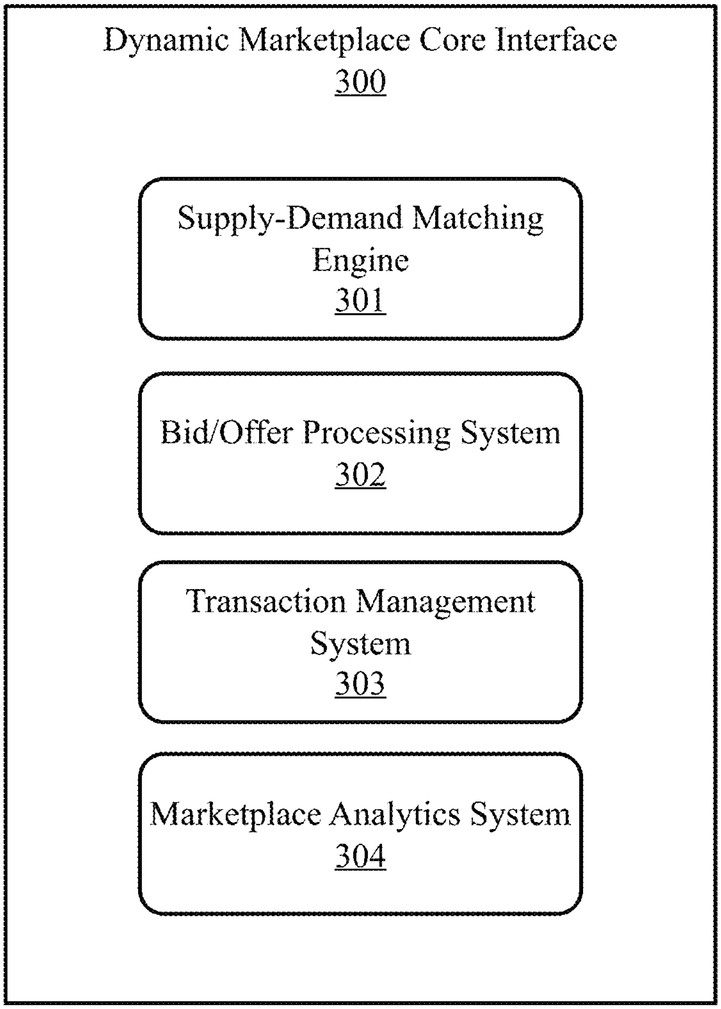
FIG. 3 is a block diagram illustrating an exemplary aspect of the labor arbitrage marketplace platform, a dynamic marketplace core interface.

FIG. 3 is a block diagram illustrating an exemplary aspect of the labor arbitrage marketplace platform, a dynamic marketplace core interface. Dynamic marketplace core 300 comprises various integrated transaction processing systems that facilitate real-time resource arbitrage between professional services organizations through automated matching, negotiation, and transaction management capabilities.

According to an embodiment, a supply-demand matching engine 301 implements multi-criteria optimization algorithms to identify optimal pairings between resource requests and available consultant capacity across multiple participating organizations. Supply-demand matching engine 301 receives resource requirements from understaffed firms including, but not limited to, specific skill set requirements, project duration estimates, budget parameters, timeline constraints, and collaborative fit preferences derived from client personality profiles and organizational culture assessments. Supply-demand matching engine 301 processes available capacity data from core resource planning engine 200 including consultant skill inventories, availability windows, hourly rate ranges, quality ratings, and collaborative compatibility scores to generate comprehensive resource profiles for matching analysis. Supply-demand matching engine 301 implements weighted scoring algorithms that evaluate potential matches across multiple dimensions including, for example, technical skill alignment, availability overlap, cost optimization, geographic proximity, and predicted collaborative success based on personality assessment data and historical project outcomes. Supply-demand matching engine 301 applies machine learning algorithms including collaborative filtering, content-based filtering, and hybrid recommendation systems to continuously improve matching accuracy by analyzing successful placements, project completion rates, client satisfaction scores, and consultant performance metrics. In some implementations, supply-demand matching engine 301 generates ranked lists of potential resource matches with confidence scores, enabling requesting firms to evaluate multiple options while providing transparency into matching criteria and rationale for recommended pairings.

A bid/offer processing system 302 implements automated negotiation protocols to facilitate resource transactions between participating organizations while optimizing pricing and contract terms, with specialized capabilities for overstaffed firms to proactively offer available consultants to the marketplace. Bid/offer processing system 302 receives resource requests with specified budget ranges, preferred engagement structures, and negotiable terms including, but not limited to, hourly rates, project milestones, payment schedules, and performance incentives from requesting organizations. Bid/offer processing system 302 can process resource offers from supplying organizations including consultant availability confirmations, proposed rates, alternative engagement models, and customized terms based on project requirements and consultant preferences. According to an embodiment, bid/offer processing system 302 implements comprehensive offer management workflows that enable overstaffed firms to pursue work for their underutilized team members through multiple targeting strategies including, for instance, direct outreach to preferred partner organizations with established relationships and broad marketplace exposure to all available opportunities. Bid/offer processing system 302 provides flexible offering configurations that allow overstaffed firms to present individual consultants for specific opportunities or package multiple resources as combined offers requiring acceptance of full or partial teams based on project requirements and strategic partnership objectives. According to an aspect, bid/offer processing system 302 implements dynamic pricing algorithms that consider market demand, consultant expertise levels, project complexity, timeline urgency, and historical pricing data to generate competitive rate recommendations that balance market efficiency with participant satisfaction while maximizing revenue opportunities for overstaffed firms. Bid/offer processing system 302 may apply automated negotiation algorithms including, but not limited to, multi-party auction mechanisms, sealed-bid processes, and iterative negotiation protocols to facilitate price discovery and contract optimization while maintaining fairness and transparency across all marketplace participants. Bid/offer processing system 302 may implement contract term optimization by analyzing project requirements against consultant capabilities and preferences, automatically generating customized engagement structures including performance milestones, deliverable specifications, quality metrics, and dispute resolution procedures tailored to specific project characteristics.

A transaction management system 303 provides secure transaction processing capabilities including, but not limited to, escrow services, contract generation, payment processing, and dispute resolution workflows for marketplace transactions. Transaction management system 303 can implement secure escrow mechanisms that hold client payments in protected accounts until project milestones are completed and deliverables are accepted, providing financial security for both consulting firms and individual freelancers while ensuring payment obligations are fulfilled according to agreed contract terms. Transaction management system 303 generates legally compliant contracts automatically based on negotiated terms, incorporating standardized clauses for intellectual property protection, confidentiality requirements, liability limitations, and dispute resolution procedures while accommodating custom terms specific to individual engagements. In some implementations, one or more generative artificial intelligence (AI) systems may be employed to generate contracts. Transaction management system 303 integrates with multiple payment processing systems including automate clearing house (ACH) transfers, wire transfers, and digital payment platforms (e.g., credit platforms, cryptocurrency platforms) to facilitate secure, timely compensation distribution while maintaining detailed transaction records for accounting and tax reporting purposes. Transaction management system 303 implements dispute resolution workflows that provide structured processes for addressing conflicts including automated escalation procedures, mediation services, and arbitration mechanisms that enable fair resolution of disagreements while maintaining marketplace integrity and participant confidence.

A marketplace analytics system 304 processes transaction data to generate performance metrics, pricing optimization recommendations, and market trend analyses that inform strategic decision-making for marketplace participants. Marketplace analytics system 304 tracks key performance indicators including, but not limited to, average project completion times, client satisfaction ratings, consultant utilization rates, successful match percentages, and revenue generation across different practice areas and skill categories to provide comprehensive marketplace health monitoring. Marketplace analytics system 304 implements pricing analysis algorithms that monitor rate trends, identify pricing inefficiencies, and generate dynamic pricing recommendations based on supply-demand imbalances, seasonal patterns, and competitive market conditions to optimize revenue generation for all marketplace participants. Marketplace analytics system 304 processes market trend data to identify emerging skill demands, practice area growth patterns, geographic expansion opportunities, and technological disruption impacts that enable participating firms to make informed strategic decisions about workforce development and business development investments. Marketplace analytics system 304 can generate predictive analytics using time series analysis, regression modeling, and machine learning algorithms to forecast future market conditions, anticipated demand fluctuations, and optimal capacity planning strategies that enable proactive resource management and competitive positioning.

Dynamic marketplace core interface 300 implements coordinated data processing workflows across all four transaction processing systems. Supply-demand matching engine 301 communicates optimal matches to bid/offer processing system 302 for negotiation initiation and receives pricing feedback to refine matching algorithms based on successful transaction outcomes. Bid/offer processing system 302 transfers successfully negotiated agreements to transaction management system 303 for secure processing and contract execution while providing negotiation outcome data to marketplace analytics system 304 for pricing optimization analysis. Transaction management system 303 communicates project completion data and performance metrics to marketplace analytics system 304 for trend analysis and provides transaction success indicators to supply-demand matching engine 301 for matching algorithm improvement. Marketplace analytics system 304 distributes market intelligence and optimization recommendations to all other systems to enable continuous improvement of matching accuracy, pricing efficiency, and transaction success rates.

Figure 4:
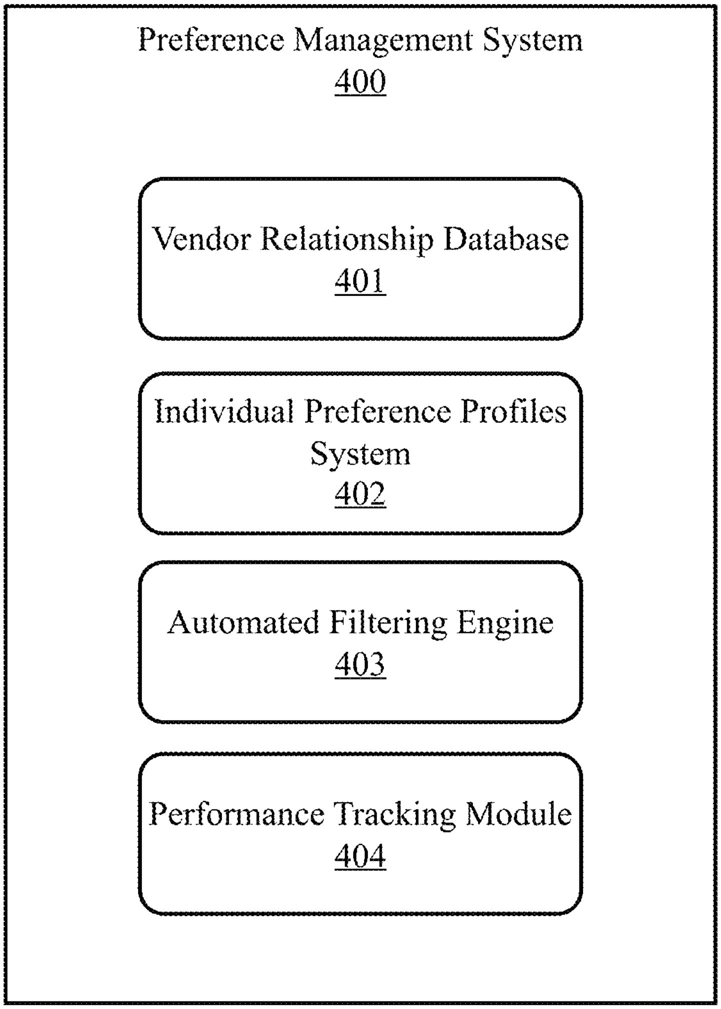
FIG. 4 is a block diagram illustrating an exemplary aspect of the labor arbitrage marketplace platform, a preference management system.

FIG. 4 is a block diagram illustrating an exemplary aspect of the labor arbitrage marketplace platform, a preference management system. Preference management system 400 comprises various interconnected modules that maintain relationship optimization data and implement automated filtering algorithms to prioritize resource matches based on pre-established organizational and individual preferences.

A vendor relationship database 401 maintains comprehensive relationship data between participating professional services organizations to enable preference-based resource allocation and strategic partnership management. Vendor relationship database 401 may store hierarchical vendor networks that define preferred partnership relationships across multiple organizational tiers including, but not limited to, strategic partners with comprehensive service agreements, preferred vendors with established working relationships, approved vendors meeting minimum qualification standards, excluded vendors (e.g., competitors), and probationary vendors undergoing evaluation processes. According to an aspect, vendor relationship database 401 implements relationship scoring algorithms that evaluate vendor partnerships based on historical project success rates, client satisfaction metrics, on-time delivery performance, budget adherence records, and collaborative effectiveness scores derived from post-project evaluations and stakeholder feedback. Vendor relationship database 401 can process engagement history data including, but not limited to, project volumes, revenue generated, consultant quality ratings, and dispute frequency to calculate composite relationship strength indicators that inform future partnership decisions and resource prioritization strategies. Vendor relationship database 401 maintains dynamic partnership categorization that automatically adjusts vendor status based on performance trends, enabling promotion of consistently high-performing vendors to preferred status and identification of underperforming relationships requiring intervention or termination. In some implementations, vendor relationship database 401 implements geographic and practice area specialization tracking that correlates vendor capabilities with specific client requirements, enabling targeted partner selection based on location preferences, industry expertise, and specialized skill availability.

An individual preference profiles system 402 maintains detailed preference data for individual consultants to optimize resource matching based on personal work preferences, collaboration styles, and professional development objectives. For example, individual preference profiles system 402 processes consultant-level preference matrices that capture working style preferences including preferred project durations, team size preferences, client industry preferences, geographic location constraints, and travel willingness parameters to enable personalized resource allocation decisions. In some aspects, individual preference profiles system 402 implements skill matching algorithms that correlate consultant expertise levels with project requirements while considering professional development goals, enabling assignments that balance immediate project needs with long-term consultant growth and satisfaction objectives. Individual preference profiles system 402 maintains collaboration history data that tracks successful consultant pairings, client relationship outcomes, and team performance metrics to identify optimal working relationships and avoid problematic combinations that could negatively impact project success. Individual preference profiles system 402 processes personality assessment data including Myers-Briggs Type Indicator results, Dominance Influence Steadiness and Conscientiousness (DISC) assessments, and emotional intelligence scores to predict collaborative compatibility and optimize team compositions based on complementary personality traits and communication styles. Individual preference profiles system 402 implements one or more preference learning algorithms that analyze consultant feedback, project outcome data, and engagement satisfaction scores to continuously refine preference profiles and improve future matching accuracy through machine learning techniques.

An automated filtering engine 403 applies multi-criteria decision making algorithms (e.g., multi-objective optimization) to filter resource candidates based on organizational and individual preferences while optimizing for project success probability. In an embodiment, automated filtering engine 403 implements hierarchical filtering processes that first apply organizational-level constraints including preferred vendor relationships, budget limitations, geographic requirements, and security clearance needs before proceeding to individual-level preference matching and collaborative fit analysis. Automated filtering engine 403 can process preference weight assignments that enable organizations to prioritize different matching criteria based on project characteristics, with options to emphasize cost optimization for budget-sensitive projects, prioritize relationship strength for strategic initiatives, or focus on skill specialization for technical implementations. Automated filtering engine 403 may apply constraint satisfaction algorithms that balance competing preferences when perfect matches are unavailable, generating alternative recommendations that optimize overall satisfaction while maintaining minimum acceptable standards across all critical matching dimensions. According to an aspect, automated filtering engine 403 implements real-time preference application that dynamically filters available resources as new candidates become available or existing preferences are updated, ensuring that resource recommendations always reflect current organizational priorities and individual consultant preferences. Automated filtering engine 403 can be configured to generate preference compliance scoring that quantifies how well potential matches align with stated preferences, enabling transparent decision-making and providing feedback for preference refinement and optimization.

A performance tracking module 404 may be present and configured to analyze historical engagement outcomes to optimize relationship management and improve future preference-based matching decisions through continuous learning algorithms. Performance tracking module 404 monitors project completion metrics including, for example, delivery timeline adherence, budget performance, quality ratings, and client satisfaction scores across different vendor relationships and consultant pairings to identify success patterns and performance predictors. Performance tracking module 404 can employ one or more relationship optimization algorithms that analyze correlation patterns between preference compliance and project outcomes, enabling automatic adjustment of preference weights and filtering criteria based on demonstrated success factors in similar engagements. Performance tracking module 404 processes consultant performance data including, but not limited to, skill development progress, client feedback trends, and collaborative effectiveness improvements to update individual preference profiles and enhance future matching accuracy through outcome-based learning mechanisms. In some embodiments, performance tracking module 404 generates predictive performance models using machine learning algorithms that forecast project success probability based on proposed consultant assignments, vendor relationships, and preference compliance levels, enabling proactive risk management and optimization of resource allocation decisions. Performance tracking module 404 can be configured to implement automated preference updates that suggest modifications to organizational and individual preferences based on performance trend analysis, identifying opportunities to improve matching effectiveness and project outcomes through preference optimization strategies.

Preference management system 400 implements integrated data processing workflows that enable coordinated preference management across all system modules. For instance, vendor relationship database 401 provides relationship scoring data to automated filtering engine 403 for organizational-level filtering and communicates vendor performance metrics to performance tracking module 404 for relationship optimization analysis. Individual preference profiles system 402 supplies personal preference data to automated filtering engine 403 for consultant-level matching and receives preference optimization recommendations from performance tracking module 404 based on historical outcome analysis. Automated filtering engine 403 processes filtering results and preference compliance data to performance tracking module 404 for outcome correlation analysis and receives updated preference weights and filtering criteria based on performance optimization recommendations. Performance tracking module 404 distributes optimization insights and preference adjustment recommendations to all other modules to enable continuous improvement of vendor relationship management, individual preference accuracy, and overall matching effectiveness across the marketplace platform.

Figure 5:
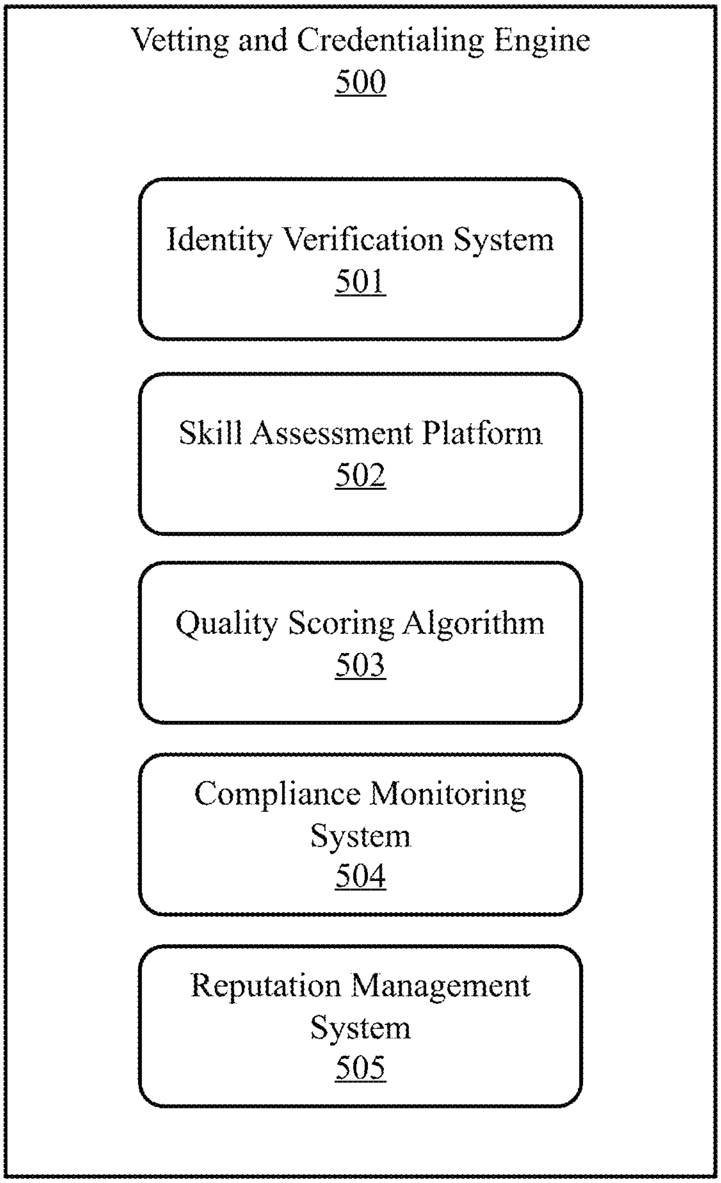
FIG. 5 is a block diagram illustrating an exemplary aspect of the labor arbitrage marketplace platform, a vetting and credentialing engine.

FIG. 5 is a block diagram illustrating an exemplary aspect of the labor arbitrage marketplace platform, a vetting and credentialing engine. Vetting and credentialing engine 500 comprises various integrated quality assurance modules that implement comprehensive validation protocols to ensure marketplace participant qualifications and maintain service quality standards across all resource transactions.

According to various embodiments, an identity verification system 501 implements multi-factor authentication and comprehensive background validation processes to establish and maintain participant identity integrity throughout the marketplace platform. For example, identity verification system 501 can be configured to process government-issued identification documents including passports, driver's licenses, and national identity cards through optical character recognition algorithms and document authenticity verification services to establish baseline identity credentials for all marketplace participants. Identity verification system 501 may integrate with professional background check services including criminal history verification, employment history validation, educational credential confirmation, and professional licensing verification to ensure comprehensive participant screening before marketplace access approval. In at least one aspect, identity verification system 501 implements biometric verification capabilities including, but not limited to, facial recognition, fingerprint scanning, and voice recognition technologies to prevent identity fraud and ensure ongoing authentication security for high-value transactions and sensitive client engagements. Identity verification system 501 maintains secure identity records using encrypted storage protocols and implements regular re-verification requirements including annual background check updates, periodic identity confirmation, and continuous monitoring for adverse events that could impact participant qualification status. Identity verification system 501 processes international verification requirements for global marketplace participants, coordinating with international background check services, embassy verification procedures, and country-specific professional licensing authorities to enable worldwide consultant participation while maintaining consistent quality standards.

A skill assessment platform 502 conducts comprehensive technical and professional competency evaluations to validate consultant expertise levels and maintain accurate skill inventories for marketplace matching algorithms. In some implementations, skill assessment platform 502 utilizes standardized technical assessments across multiple professional domains including management consulting methodologies, technology implementation frameworks, financial analysis techniques, and strategic planning approaches through adaptive testing algorithms that adjust question difficulty based on candidate performance levels. Skill assessment platform 502 integrates with professional certification databases including Project Management Institute, Certified Public Accountant registries, technology vendor certification programs, and industry-specific professional organizations to validate existing credentials and maintain current certification status monitoring. Skill assessment platform 502 may conduct practical skill demonstrations through simulated client scenarios, case study analysis exercises, and collaborative problem-solving assessments that evaluate both technical competency and client interaction capabilities under realistic consulting engagement conditions. Skill assessment platform 502 may implement peer review assessment protocols that enable experienced consultants to evaluate candidate performance through structured interview processes, technical review sessions, and collaborative work sample evaluations to provide comprehensive skill validation beyond automated testing mechanisms. Skill assessment platform 502 maintains dynamic skill profiles that continuously update consultant competency levels based on ongoing project performance, additional certification achievements, and peer feedback to ensure accurate representation of current capabilities in marketplace matching algorithms.

A quality scoring algorithm 503 processes comprehensive performance data to generate composite quality ratings that inform marketplace matching decisions and enable continuous performance monitoring across all participant categories. In some embodiments, quality scoring algorithm 503 implements weighted performance metrics that combine client satisfaction ratings, project completion success rates, deadline adherence records, budget performance indicators, and collaborative effectiveness scores to generate comprehensive consultant quality profiles (among other parameters) for marketplace evaluation. Quality scoring algorithm 503 can process client feedback data including structured evaluation forms, narrative feedback comments, and numerical rating scales across multiple performance dimensions including technical competency, communication effectiveness, problem-solving capability, and professional conduct to maintain detailed quality assessments. Quality scoring algorithm 503 may implement one or more statistical analysis algorithms that normalize performance scores across different client types, project complexities, and engagement durations to ensure fair comparative evaluation and prevent bias toward specific engagement characteristics or client preferences. Quality scoring algorithm 503 applies machine learning algorithms including, but not limited to, regression analysis, clustering techniques, and predictive modeling to identify performance patterns, predict future quality outcomes, and generate early warning indicators for potential performance issues requiring intervention or additional support. According to an aspect, quality scoring algorithm 503 generates dynamic quality adjustments that account for performance trends, learning curves for new consultants, and improvement initiatives to provide accurate current quality assessments that reflect consultant development and capability enhancement over time.

A compliance monitoring system 504 tracks regulatory requirements and professional standards adherence to ensure marketplace participants maintain necessary qualifications and comply with applicable legal and professional obligations. Compliance monitoring system 504 can be configured to support automated tracking of professional licensing requirements including license renewal dates, continuing education obligations, and regulatory compliance mandates across multiple jurisdictions to ensure consultant eligibility for client engagements requiring specific credentials. Compliance monitoring system 504 can be configured to monitor industry-specific certification requirements including technology vendor certifications, financial services credentials, healthcare compliance standards, and government security clearances through automated notification systems and periodic verification processes. Compliance monitoring system 504 processes legal and regulatory updates that affect consultant qualification requirements, automatically notifying affected participants of new compliance obligations and providing guidance for maintaining marketplace eligibility through regulatory change management. Compliance monitoring system 504 implements audit trail maintenance that documents all compliance verification activities, certification updates, and regulatory status changes to provide comprehensive documentation for client due diligence requirements and regulatory inquiry responses. According to an aspect, compliance monitoring system 504 generates compliance risk assessments that identify potential qualification gaps, upcoming renewal requirements, and regulatory exposure issues to enable proactive compliance management and prevent disruption of consultant availability for marketplace transactions.

According to an embodiment, a reputation management system 505 aggregates peer feedback and professional references to maintain comprehensive reputation profiles that supplement objective performance metrics with qualitative professional assessments. Reputation management system 505 can be configured to implement structured peer review processes that enable colleagues, clients, and project stakeholders to provide detailed feedback on consultant performance including, but not limited to, collaboration effectiveness, technical expertise demonstration, problem-solving approach, and professional conduct during engagements. Reputation management system 505 can process professional reference validation through automated reference checking services that verify employment history, performance claims, and professional accomplishments while maintaining confidentiality and preventing reference fatigue through efficient verification protocols. Reputation management system 505 may maintain professional network analysis that tracks consultant relationships, collaboration patterns, and professional endorsements to identify reputation trends and validate claimed expertise through peer recognition and professional community involvement. Reputation management system 505 can implement one or more reputation scoring algorithms that combine quantitative performance data with qualitative peer assessments to generate comprehensive reputation profiles that inform marketplace matching decisions and enable clients to evaluate consultant suitability beyond technical qualifications. In some implementations, reputation management system 505 applies fraud detection algorithms that identify suspicious feedback patterns, coordinated review manipulation, and artificial reputation enhancement attempts to maintain reputation system integrity and ensure authentic professional assessment data.

Vetting and credentialing engine 500 implements coordinated validation workflows that enable comprehensive quality assurance across all system modules. For example, identity verification system 501 provides verified participant credentials to skill assessment platform 502 for competency evaluation initiation and communicates identity validation status to compliance monitoring system 504 for regulatory verification processes. Skill assessment platform 502 supplies competency evaluation results to quality scoring algorithm 503 for performance baseline establishment and provides skill verification data to reputation management system 505 for peer assessment coordination. Quality scoring algorithm 503 communicates performance metrics to compliance monitoring system 504 for risk assessment analysis and provides quality indicators to reputation management system 505 for reputation scoring algorithm input. Compliance monitoring system 504 distributes regulatory status updates to all other modules to ensure compliance considerations are integrated into identity verification, skill assessment, quality scoring, and reputation management processes. Reputation management system 505 provides comprehensive reputation profiles to all other modules to enhance verification accuracy, assessment reliability, scoring validity, and compliance risk evaluation across the entire vetting and credentialing process.

Figure 6:
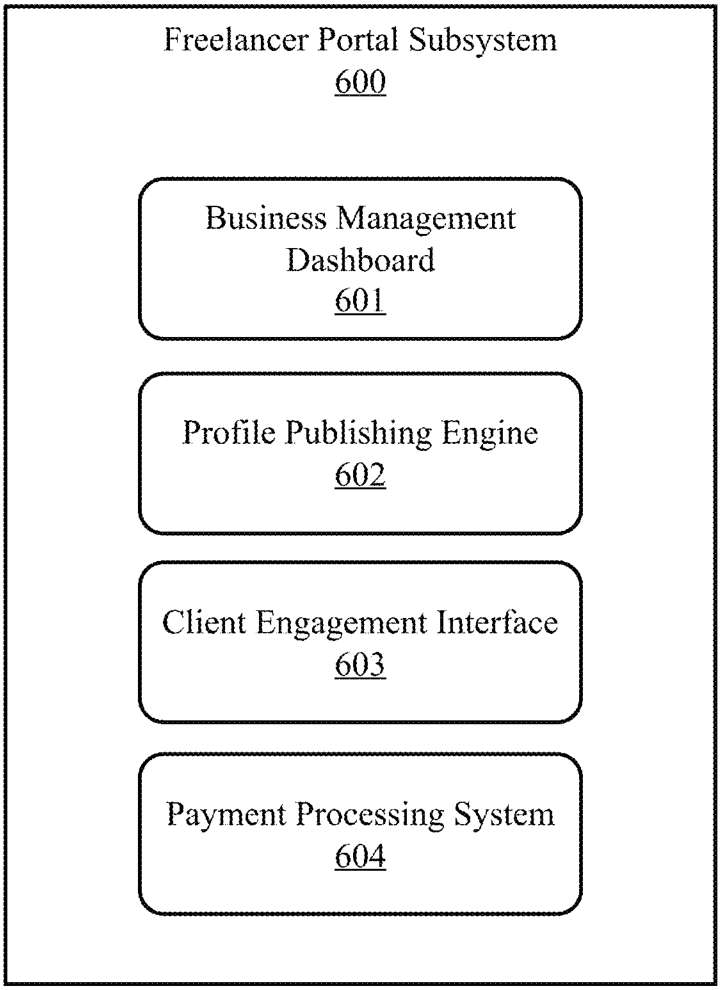
FIG. 6 is a block diagram illustrating an exemplary aspect of the labor arbitrage marketplace platform, a freelancer portal subsystem.

FIG. 6 is a block diagram illustrating an exemplary aspect of the labor arbitrage marketplace platform, a freelancer portal subsystem. Freelancer portal subsystem 600 comprises various integrated business management modules that provide comprehensive tools for independent consultants to manage their professional operations and participate effectively in the labor arbitrage marketplace.

A business management dashboard 601 provides centralized financial and operational management capabilities that enable independent consultants to operate their consulting practices efficiently while participating in marketplace transactions. Business management dashboard 601 implements comprehensive revenue tracking algorithms that monitor income streams across multiple client engagements, marketplace transactions, and direct consulting arrangements while automatically categorizing revenue by project type, client industry, and engagement duration for detailed financial analysis. Business management dashboard 601 processes expense management workflows including, for example, travel costs, professional development expenses, equipment purchases, and business operation costs through automated categorization systems and receipt processing technologies that enable accurate profit margin calculations and tax preparation support. Business management dashboard 601 maintains client relationship management capabilities including contact databases, communication histories, engagement timelines, and satisfaction tracking that enable freelancers to nurture long-term client relationships while identifying opportunities for repeat business and referral generation. Business management dashboard 601 implements project portfolio management tools that track active engagements, upcoming deadlines, deliverable status, and resource allocation across multiple concurrent projects while providing capacity planning capabilities that optimize consultant utilization and identify availability for new marketplace opportunities. According to an aspect, business management dashboard 601 generates comprehensive business analytics including revenue trends, profit margin analysis, client acquisition costs, and market positioning insights that enable strategic business development decisions and competitive positioning within the marketplace ecosystem.

A profile publishing engine 602 enables consultants to create and maintain professional profiles that optimize their visibility and attractiveness to potential clients in the marketplace matching algorithms. According to an embodiment, profile publishing engine 602 may implement automated curriculum vita (CV) optimization algorithms that analyze consultant background data, extract key achievements and skills, and format professional profiles according to industry best practices while incorporating search engine optimization techniques that improve profile discoverability in marketplace searches. Profile publishing engine 602 can process skill taxonomy mapping that correlates consultant expertise with standardized skill categories and proficiency levels while enabling consultants to demonstrate competency through work samples, certification uploads, and peer endorsements that validate claimed capabilities. Profile publishing engine 602 maintains dynamic profile optimization that continuously updates consultant profiles based on completed projects, newly acquired certifications, client feedback, and market demand trends to ensure profiles remain current and competitive in marketplace matching algorithms. Profile publishing engine 602 can be configured to support portfolio showcase capabilities that enable consultants to present case studies, project outcomes, client testimonials, and work samples through multimedia presentations that demonstrate value delivery and differentiate consultant offerings from competitors. Profile publishing engine 602 provides profile performance analytics that track profile views, inquiry rates, engagement success, and conversion metrics while offering optimization recommendations that improve profile effectiveness and marketplace positioning.

According to an embodiment, a client engagement interface 603 facilitates direct communication and transaction management between freelancers and potential clients through integrated messaging, proposal generation, and contract negotiation capabilities. Client engagement interface 603 implements secure messaging systems that enable real-time communication between consultants and clients while maintaining conversation histories, file sharing capabilities, and integration with calendar scheduling for meeting coordination and project collaboration. Client engagement interface 603 can be configured to provide proposal generation tools that enable consultants to create professional project proposals incorporating standardized templates, custom pricing models, deliverable specifications, and timeline estimates while automatically incorporating consultant credentials and relevant experience from their marketplace profiles. In some embodiments, client engagement interface 603 can implement contract negotiation workflows that facilitate terms discussion, scope refinement, and agreement finalization through structured negotiation interfaces that track proposal revisions, counteroffers, and final agreement terms while maintaining audit trails for dispute resolution purposes. Client engagement interface 603 may manage project collaboration tools including, for instance, milestone tracking, deliverable submission systems, progress reporting capabilities, and client feedback collection that enable efficient project execution and client satisfaction optimization throughout engagement lifecycles. Client engagement interface 603 provides relationship management capabilities that track client interaction histories, preference profiles, and satisfaction metrics while identifying opportunities for engagement extensions, additional services, and long-term partnership development.

A payment processing system 604 implements comprehensive financial transaction management that enables secure payment collection, automated invoicing, and financial reporting for freelancer business operations. Payment processing system 604 integrates with multiple payment gateway services including, but not limited to, PayPal, Stripe, and traditional banking systems to provide flexible payment options that accommodate diverse client preferences while maintaining secure transaction processing and fraud protection capabilities. Payment processing system 604 can be configured to generate automated invoicing systems that create professional invoices based on project milestones, hourly tracking, or fixed-price agreements while incorporating tax calculations, payment terms, and late fee policies that streamline accounts receivable management for consultant businesses. Payment processing system 604 implements escrow management capabilities that coordinate with marketplace transaction systems to provide secure payment holding for milestone-based projects while ensuring consultants receive timely compensation upon deliverable acceptance and client satisfaction confirmation. In various implementations, payment processing system 604 provides comprehensive financial reporting tools that generate profit and loss statements, tax reporting documentation, quarterly business summaries, and cash flow analyses that support business decision-making and regulatory compliance requirements for independent consultant operations. In some aspects, payment processing system 604 maintains one or more payment optimization algorithms that analyze payment patterns, identify collection issues, and recommend pricing strategies while providing early warning systems for potential payment problems and automated follow-up processes for overdue accounts.

Freelancer portal subsystem 600 implements integrated workflow coordination that enables seamless data sharing and process optimization across various business management modules. For example, business management dashboard 601 provides financial and operational data to payment processing system 604 for revenue reconciliation and to profile publishing engine 602 for performance-based profile optimization. Profile publishing engine 602 supplies consultant capability data to client engagement interface 603 for proposal generation and communicates profile performance metrics to business management dashboard 601 for marketing effectiveness analysis. Client engagement interface 603 transmits project agreements and milestone data to payment processing system 604 for invoicing automation and provides client interaction data to business management dashboard 601 for relationship management optimization. Payment processing system 604 communicates financial transaction data to business management dashboard 601 for comprehensive business analytics and provides payment confirmation data to client engagement interface 603 for project status updates and client relationship management.

Figure 7:
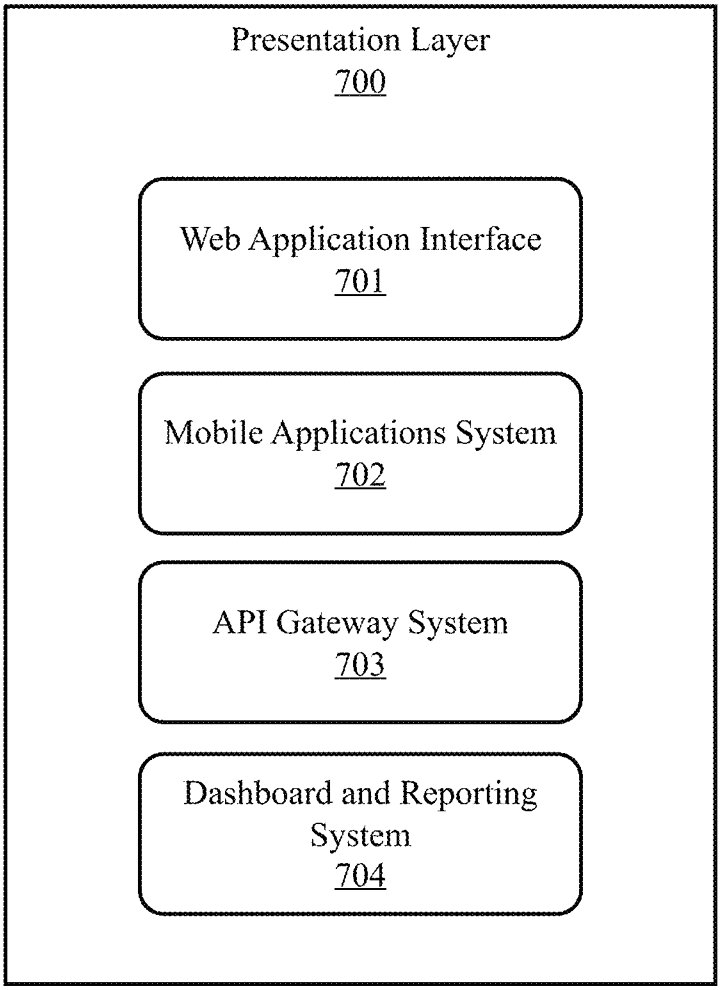
FIG. 7 is a block diagram illustrating an exemplary aspect of the labor arbitrage marketplace platform, a presentation layer.

FIG. 7 is a block diagram illustrating an exemplary aspect of the labor arbitrage marketplace platform, a presentation layer. Presentation layer 700 comprises various integrated interface systems that provide comprehensive user interaction capabilities across multiple device types and integration scenarios while enabling seamless access to all marketplace platform functionality.

According to an embodiment, a web application interface 701 implements responsive web-based user interfaces that provide marketplace access through modern browser technologies and adaptive design frameworks optimized for diverse screen sizes and user preferences. In some aspects, web application interface 701 utilizes progressive web application architecture with service worker implementations that enable offline functionality, background synchronization, and push notifications while maintaining consistent user experience across different browsers and operating systems. Web application interface 701 may implement role-based interface customization that presents different dashboard configurations, navigation structures, and feature sets based on user types including firm administrators, project managers, individual consultants, and freelancers while maintaining consistent design patterns and user interaction paradigms. According to an embodiment, web application interface 701 provides real-time data visualization capabilities through interactive dashboards that display resource allocation matrices, capacity utilization charts, marketplace activity feeds, and performance analytics using dynamic charting libraries and data binding frameworks that update automatically as underlying data changes. Web application interface 701 may implement advanced search and filtering interfaces that enable users to discover resources, projects, and opportunities through multi-criteria search forms, faceted navigation systems, and intelligent suggestion algorithms that learn from user behavior patterns and preferences. In some implementations, web application interface 701 maintains accessibility compliance through Web Content Accessibility Guidelines (WCAG) 2.1 AA standards implementation including keyboard navigation support, screen reader compatibility, color contrast optimization, and alternative text provision that ensures platform accessibility for users with diverse abilities and assistive technology requirements.

According to an embodiment, a mobile applications system 702 provides native iOS and Android applications that enable full marketplace participation through optimized mobile user experiences tailored for consultant productivity and client engagement on portable devices. Mobile applications system 702 may implement native application development using platform-specific technologies including Swift for iOS and Kotlin for Android while maintaining feature parity with web interfaces through shared business logic APIs and consistent user experience design patterns. In some implementations, mobile applications system 702 provides location-aware functionality that enables consultants to discover nearby opportunities, track travel time for client meetings, and optimize scheduling based on geographic constraints while maintaining privacy controls and location data security protocols. Mobile applications system 702 implements push notification systems that provide real-time alerts for new opportunities, project updates, payment confirmations, and system notifications through platform-specific notification services while enabling user customization of notification preferences and delivery schedules. Mobile applications system 702 maintains offline synchronization capabilities that enable consultants to access project information, update availability status, and prepare proposals without internet connectivity while automatically synchronizing data when network access is restored. Mobile applications system 702 can provide mobile-optimized workflows including simplified proposal creation, streamlined availability updates, quick response messaging, and one-tap opportunity acceptance that accommodate mobile usage patterns and enable efficient marketplace participation during travel or client site visits.

An API gateway system 703 implements comprehensive application programming interfaces that enable third-party system integrations and custom application development while maintaining security, rate limiting, and version management for external platform access. In some embodiments, API gateway system 703 provides RESTful API endpoints with OpenAPI specification documentation that enable integration with existing firm management systems, accounting software, project management tools, and custom applications while maintaining consistent data formats and authentication protocols. In some aspects, API gateway system 703 implements OAuth 2.0 authentication and authorization frameworks that provide secure API access through token-based authentication, scope-limited permissions, and refresh token management while enabling fine-grained access control for different integration scenarios and security requirements. API gateway system 703 maintains API rate limiting and throttling mechanisms that prevent abuse, ensure fair resource allocation among API consumers, and maintain system performance during high-volume integration scenarios while providing usage analytics and quota management for API key holders. API gateway system 703 can provide webhook notification systems that enable real-time event broadcasting to external systems including project status updates, resource allocation changes, and transaction completions while maintaining reliable delivery guarantees and retry mechanisms for failed notifications. API gateway system 703 may implement API versioning strategies that enable backward compatibility maintenance while supporting new feature rollouts and ensuring existing integrations continue functioning during platform evolution and enhancement cycles.

According to an embodiment, a dashboard and reporting system 704 generates comprehensive analytics visualizations and customizable reporting capabilities that provide stakeholders with actionable insights into marketplace performance and operational efficiency metrics. Dashboard and reporting system 704 can implement interactive dashboard creation tools that enable users to design custom analytics views by selecting data sources, visualization types, filter criteria, and refresh schedules while maintaining performance optimization through efficient data aggregation and caching strategies. According to an embodiment, dashboard and reporting system 704 provides pre-configured (e.g., default) dashboard templates for different user roles including executive summaries for firm leadership, operational dashboards for project managers, performance tracking for consultants, and financial reporting for accounting teams while enabling customization and personalization of standard dashboard configurations. Dashboard and reporting system 704 can implement advanced data visualization capabilities including heat maps for resource utilization, trend analysis charts for performance metrics, geographic mapping for consultant distribution, and comparative analytics for benchmarking against industry standards and peer organizations. Dashboard and reporting system 704 maintains automated reporting workflows that generate scheduled reports including weekly utilization summaries, monthly financial statements, quarterly performance reviews, and annual trend analyses while providing customizable report formats and distribution mechanisms including email delivery and secure download links. Dashboard and reporting system 704 may provide drill-down analysis capabilities that enable users to navigate from high-level summary metrics to detailed transaction data while maintaining data security and access control based on user permissions and organizational data visibility policies.

Presentation layer 700 implements coordinated user experience optimization that ensures consistent functionality and design patterns across all interface systems while maintaining platform-specific optimizations and user preference accommodations. Web application interface 701 provides baseline functionality and design patterns that mobile applications system 702 adapts for touch interfaces and mobile workflows while maintaining feature consistency and data synchronization across platforms. API gateway system 703 supplies standardized data access and business logic that both web application interface 701 and mobile applications system 702 utilize for consistent functionality while enabling custom integrations and third-party application development. Dashboard and reporting system 704 aggregates usage analytics and performance metrics from web application interface 701, mobile applications system 702, and API gateway system 703 to provide comprehensive platform utilization insights and user experience optimization recommendations. All interface systems coordinate through shared authentication services, consistent data models, and unified business logic APIs to ensure seamless user experience transitions between different access methods and maintain data consistency across multiple interaction channels.

Figure 8:
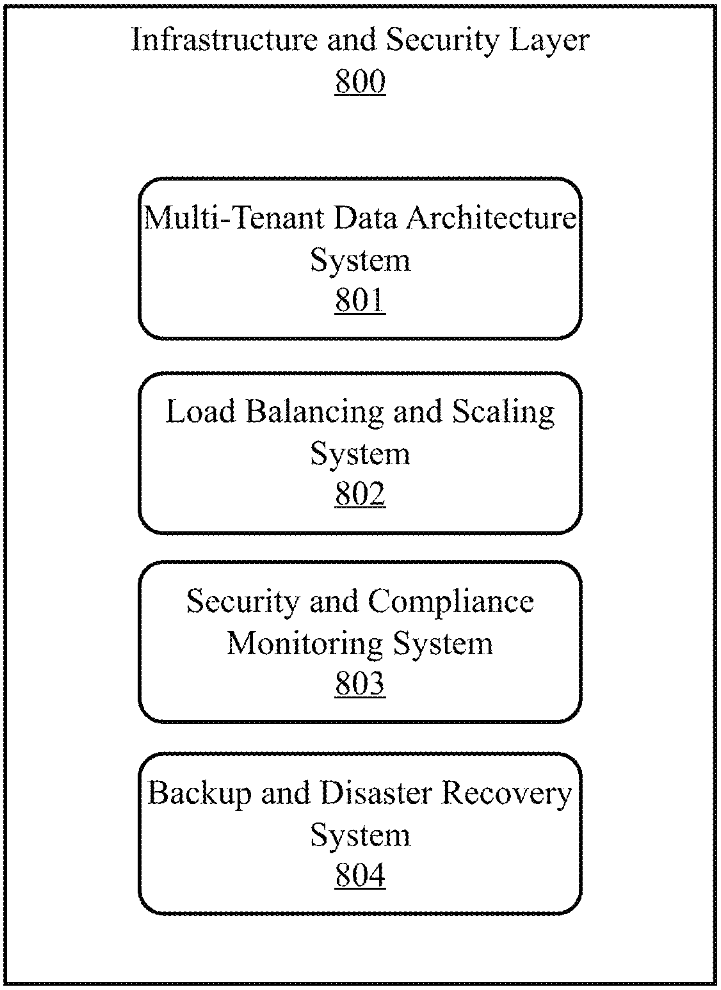
FIG. 8 is a block diagram illustrating an exemplary aspect of the labor arbitrage marketplace platform, an infrastructure and security layer.

FIG. 8 is a block diagram illustrating an exemplary aspect of the labor arbitrage marketplace platform, an infrastructure and security layer. Infrastructure and security layer 800 comprises various service modules that provide comprehensive computing infrastructure, security protocols, compliance frameworks, and operational support capabilities for all marketplace platform components.

According to the embodiment, a multi-tenant data architecture system 801 implements sophisticated data isolation and security protocols that enable secure sharing of marketplace information while maintaining strict organizational data boundaries and privacy protection for all participating firms. Multi-tenant data architecture system 801 can utilize tenant-specific encryption protocols that assign unique encryption keys to each participating organization while maintaining master key management through hardware security modules and key rotation policies that ensure cryptographic security and prevent unauthorized data access across organizational boundaries. In some implementations, multi-tenant data architecture system 801 may implement row-level security mechanisms that automatically filter database queries based on organizational affiliation and user permissions while maintaining query performance through optimized indexing strategies and tenant-aware query planning algorithms. Multi-tenant data architecture system 801 can also provide data residency compliance capabilities that enable organizations to specify geographic data storage requirements while maintaining global platform accessibility through distributed data replication and intelligent data routing based on regulatory constraints and performance optimization requirements. Multi-tenant data architecture system 801 maintains comprehensive audit logging that tracks all data access events, modification activities, and cross-tenant interactions while providing tamper-evident log storage and automated compliance reporting for regulatory examination and security incident investigation. Multi-tenant data architecture system 801 can be configured to implement dynamic data classification and labeling systems that automatically identify sensitive information including personally identifiable information, financial data, and proprietary business information while applying appropriate protection levels and access controls based on data sensitivity classifications.

A load balancing and scaling system 802 provides automated infrastructure management capabilities that ensure optimal performance and availability through intelligent resource allocation and dynamic capacity adjustment based on real-time demand patterns. Load balancing and scaling system 802 utilizes container orchestration platforms including, for example, Kubernetes clusters with horizontal pod autoscaling that automatically adjusts computing resources based on CPU utilization, memory consumption, and custom metrics including transaction volumes and response times while maintaining service availability during scaling operations. In some embodiments, load balancing and scaling system 802 implements intelligent traffic distribution algorithms that route requests across multiple server instances based on geographic proximity, server health metrics, and current load levels while providing session affinity and failover capabilities that maintain user experience consistency during infrastructure changes. Load balancing and scaling system 802 provides predictive scaling algorithms that analyze historical usage patterns, marketplace activity trends, and seasonal demand fluctuations to proactively adjust infrastructure capacity before demand spikes occur while optimizing cost efficiency through intelligent resource allocation and automated resource decommissioning during low-usage periods. Load balancing and scaling system 802 can maintain global content delivery network integration that caches static assets and frequently accessed data at edge locations worldwide while implementing intelligent cache invalidation and content optimization strategies that minimize latency and bandwidth consumption for international marketplace participants. In at least one embodiment, load balancing and scaling system 802 implements blue-green deployment strategies that enable zero-downtime software updates and feature rollouts through parallel environment management while providing automated rollback capabilities and canary deployment options that minimize risk during platform enhancement releases.

A security and compliance monitoring system 803 implements comprehensive cybersecurity protocols and regulatory compliance frameworks that protect marketplace data and transactions while maintaining adherence to applicable legal and industry standards. Security and compliance monitoring system 803 can be configured to provide end-to-end encryption capabilities that protect data transmission and storage through, for instance, TLS 1.3 protocols for network communication, AES-256 encryption for data at rest, and elliptic curve cryptography for digital signatures while maintaining key management through certified hardware security modules and regular cryptographic key rotation procedures. Security and compliance monitoring system 803 may implement multi-factor authentication systems that require multiple verification factors including, but not limited to, passwords, biometric authentication, hardware tokens, and behavioral analysis while providing adaptive authentication that adjusts security requirements based on risk assessment algorithms and user behavior patterns. Security and compliance monitoring system 803 can maintain SOC 2 Type II compliance through comprehensive security control implementation including access controls, system monitoring, data protection, and incident response procedures while providing automated compliance reporting and continuous security assessment capabilities. Security and compliance monitoring system 803 can be configured to provide threat detection and response capabilities through machine learning-based anomaly detection, network traffic analysis, and behavioral monitoring that identify potential security incidents while implementing automated response procedures including account lockdown, traffic filtering, and incident escalation protocols. Security and compliance monitoring system 803 implements General Data Protection Regulation (GDPR) compliance frameworks that enable data subject rights management including data access requests, deletion requirements, and consent management while providing automated data lineage tracking and privacy impact assessment capabilities for regulatory compliance demonstration.

In some implementations, a backup and disaster recovery system 804 maintains comprehensive data protection and business continuity capabilities that ensure marketplace availability and data integrity through automated backup procedures and geographic redundancy strategies. Backup and disaster recovery system 804 may implement automated backup workflows that create incremental data backups at configurable intervals while maintaining multiple backup generations and automated backup verification procedures that ensure data integrity and recovery capability through regular restore testing and backup validation processes. Backup and disaster recovery system 804 can provide geographic redundancy through multi-region data replication that maintains synchronized copies of critical marketplace data across geographically distributed data centers while implementing automated failover capabilities that redirect traffic to backup regions during primary site outages or disasters. Backup and disaster recovery system 804 can be configured to maintain recovery point objectives and recovery time objectives that guarantee maximum data loss limits and service restoration timeframes through prioritized recovery procedures and automated disaster detection algorithms that trigger recovery processes when system availability falls below defined thresholds. According to an aspect, backup and disaster recovery system 804 implements comprehensive disaster recovery testing that validates recovery procedures through scheduled failover exercises and automated recovery simulations while maintaining detailed recovery documentation and staff training programs that ensure organizational readiness for disaster scenarios. Backup and disaster recovery system 804 can be configured to provide data archival capabilities that automatically migrate historical data to cost-effective long-term storage while maintaining data accessibility and search capabilities through intelligent data lifecycle management policies that balance storage costs with data retention requirements and regulatory compliance obligations.

Infrastructure and security layer 800 implements coordinated operational workflows that optimize performance, security, and reliability across various foundational service modules while maintaining comprehensive platform support capabilities. As an example, multi-tenant data architecture system 801 provides security policies and data classification requirements to security and compliance monitoring system 803 for enforcement implementation and communicates tenant-specific configuration data to load balancing and scaling system 802 for performance optimization. Load balancing and scaling system 802 supplies performance metrics and capacity utilization data to backup and disaster recovery system 804 for backup scheduling optimization and provides scaling event notifications to security and compliance monitoring system 803 for security policy adjustment during capacity changes. Security and compliance monitoring system 803 distributes threat intelligence and security incidents to all other systems for coordinated security response and provides compliance status updates to backup and disaster recovery system 804 for regulatory requirement integration. Backup and disaster recovery system 804 communicates data protection status and recovery capabilities to multi-tenant data architecture system 801 for data residency compliance and provides disaster recovery metrics to load balancing and scaling system 802 for failover planning and capacity management optimization.

Figure 9:
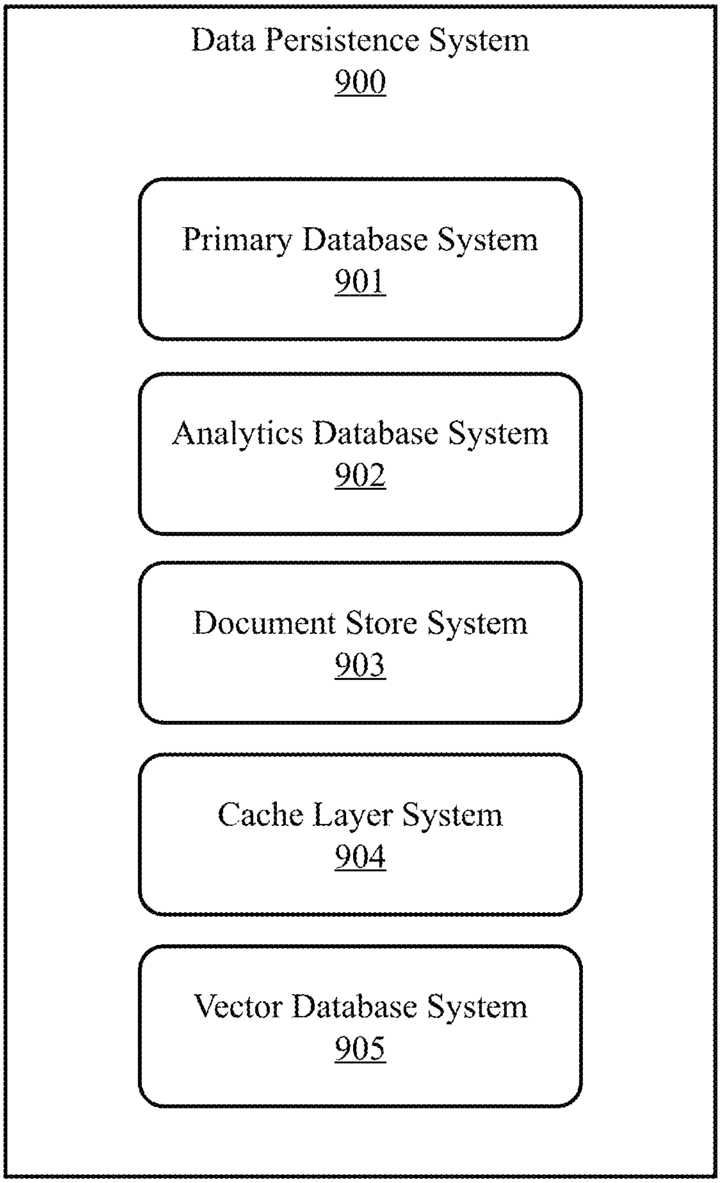
FIG. 9 is a block diagram illustrating an exemplary aspect of the labor arbitrage marketplace platform, a data persistence system

FIG. 9 is a block diagram illustrating an exemplary aspect of the labor arbitrage marketplace platform, a data persistence system. According to the embodiment, the data persistence architecture 900 comprises a plurality of specialized database systems that provide optimized data storage, retrieval, and processing capabilities to support the diverse operational requirements of the labor arbitrage marketplace platform.

A primary database system 901 implements distributed relational database architecture to manage transactional data with Atomicity, Consistency, Isolation, and Durability (ACID) compliance and high availability requirements for critical marketplace operations. In some implementations, primary database system 901 may utilize distributed (e.g., PostgreSQL and/or the like) clusters with master-slave replication configurations that ensure data consistency, fault tolerance, and automatic failover capabilities while maintaining system availability during hardware failures, software updates, and scheduled maintenance operations through synchronized data replication and health monitoring algorithms. Primary database system 901 can implement horizontal sharding strategies that partition data across multiple database nodes based on organizational boundaries and data access patterns, enabling tenant-specific data isolation while maintaining query performance and linear scalability as marketplace participation grows beyond millions of users and billions of transactions. Primary database system 901 manages core transactional data including, but not limited to, user account information, authentication credentials, project assignments, contract details, payment records, organizational relationships, and marketplace transactions through optimized table structures, composite indexing strategies, and query execution plans that support high-frequency read and write operations exceeding 100,000 transactions per second. Primary database system 901 can implement advanced query optimization techniques including, but not limited to, materialized views for complex aggregations, partial indexing for selective data access, query plan caching for repeated operations, and connection pooling management that maintain sub-second response times for complex relational queries across large datasets containing millions of consultant profiles, project records, and historical transaction data. Primary database system 901 provides ACID transaction guarantees for critical operations including resource allocations, contract modifications, payment processing, account status changes, and preference updates to ensure data integrity and prevent inconsistent states that could impact marketplace functionality, participant trust, or financial accuracy during concurrent multi-user operations.

According to an embodiment, an analytics database system 902 implements specialized time-series data storage to support real-time performance monitoring, trend analysis, and predictive modeling capabilities across the marketplace platform through optimized temporal data management and analytical query processing. In some implementations, analytics database system 902 utilizes an exemplary InfluxDB time-series database technology optimized for high-volume data ingestion, temporal data compression, and rapid aggregation queries that enable real-time dashboard updates, performance metric calculations, and trend analysis across multiple time horizons from seconds to years. Analytics database system 902 processes performance metrics including consultant utilization rates, project completion timelines, client satisfaction scores, marketplace transaction volumes, revenue trends, and system performance indicators through automated data collection workflows that capture measurements at configurable intervals ranging from real-time streaming to periodic batch processing based on metric types and analytical requirements. Analytics database system 902 can implement data retention policies that automatically archive historical performance data to cost-effective storage tiers while maintaining immediate access to recent metrics and enabling long-term trend analysis through intelligent data lifecycle management that balances storage costs with analytical value and regulatory compliance requirements. Analytics database system 902 can be configured to provide specialized query capabilities including time-based aggregations, moving averages, percentile calculations, correlation analysis, and statistical modeling functions that support advanced analytics workflows, machine learning model training, and predictive performance optimization for marketplace participants. Analytics database system 902 implements real-time data streaming capabilities that enable continuous metric collection from all marketplace components while maintaining query performance through optimized storage formats, compression algorithms, and indexing strategies specifically designed for temporal data patterns and analytical access requirements.

According to an embodiment, a document store system 903 manages unstructured and semi-structured data including, but not limited to, consultant portfolios, client requirements, contract documents, and multimedia content through flexible document-based storage architecture that accommodates diverse content formats and enables sophisticated content analysis capabilities. According to an aspect of an embodiment, document store system 903 utilizes MongoDB (for example) database technology with distributed replica sets, horizontal scaling capabilities, and automatic failover mechanisms that accommodate diverse document formats while enabling rapid content retrieval, full-text search, and semantic matching operations for marketplace search and matching algorithms. Document store system 903 processes consultant portfolios including curriculum vitae documents, project case studies, skill certifications, professional references, work samples, and multimedia presentations through automatic content extraction algorithms, natural language processing, and indexing systems that enable full-text search, semantic matching, and content-based recommendation capabilities. Document store system 903 manages client requirement specifications including, but not limited to, project descriptions, technical specifications, team composition requirements, deliverable definitions, and proposal documents through structured document schemas that support automated parsing, content analysis, and intelligent matching against consultant capabilities using machine learning algorithms and similarity scoring. Document store system 903 implements document versioning and comprehensive audit trail capabilities that track changes to critical documents including contracts, proposals, professional profiles, and client specifications while maintaining complete revision history, change attribution, and rollback functionality for dispute resolution, compliance requirements, and data governance. In various embodiments, document store system 903 provides advanced search capabilities including full-text indexing, semantic search, faceted navigation, machine learning-based content similarity matching, and natural language query processing that enable sophisticated document discovery, content recommendation, and knowledge management algorithms for marketplace participants.

According to an embodiment, a cache layer system 904 implements distributed in-memory caching to optimize system performance through rapid data access, session management, and real-time notification capabilities for high-frequency marketplace operations and user interactions. Cache layer system 904 can utilize, for example, Redis distributed cache clusters (or similar) with automatic failover, data replication, and cluster management capabilities that provide sub-millisecond data access times for frequently requested information including user sessions, search results, computed analytics, and real-time marketplace activity feeds. Cache layer system 904 implements intelligent caching strategies including least-recently-used eviction policies, time-based expiration rules, cache warming algorithms, and predictive caching that optimize memory utilization while maintaining high cache hit ratios for improved system responsiveness and reduced database load. Cache layer system 904 may manage user session data including authentication tokens, preference settings, search histories, temporary transaction states, and user interface customizations through secure session storage that maintains user context across multiple platform interactions, device types, and session boundaries while providing session clustering and failover capabilities. In some aspects, cache layer system 904 provides real-time notification capabilities including message queuing, publish-subscribe messaging, event broadcasting, and push notification coordination that enable immediate updates for marketplace activities including new resource requests, bid notifications, project status changes, and system alerts while maintaining delivery guarantees and message ordering. Cache layer system 904 may implement distributed locking mechanisms, atomic operations, and transaction coordination that manage concurrent access to shared resources and prevent race conditions during high-volume transaction processing while maintaining data consistency across multiple application instances and ensuring marketplace integrity during peak usage periods.

According to an embodiment, a vector database system 905 is present and configured to support high-dimensional embedding storage and similarity search capabilities to enable advanced artificial intelligence features including, but not limited to, semantic matching, intelligent recommendations, and natural language understanding across marketplace content and user interactions. In some implementations, vector database system 905 can utilize specialized vector storage technology such as Pinecone, Weaviate, or Chroma that optimizes high-dimensional vector operations through efficient indexing algorithms including Hierarchical Navigable Small World graphs, Locality Sensitive Hashing, and Approximate Nearest Neighbor search that enable sub-second similarity queries across millions of embedding vectors. Vector database system 905 can process semantic embeddings generated from consultant profiles, project descriptions, skill specifications, and client requirements through large language models including bidirectional encoder representations from transformers (BERT), generative pre-trained transformer (GPT), generative adversarial network (GAN), neurosymbolic reasoning systems (e.g., employing hybrid LLM systems implementing retrieval-augmented generation and/or cache-augmented retrieval frameworks) and domain-specific transformer architectures that capture contextual meaning and enable intelligent content understanding beyond traditional keyword-based matching approaches. In some embodiments, the labor arbitrage marketplace platform implements an embedding module which transforms input data (e.g., client or consultant profiles, project descriptions, preferences, skill specifications, etc.) into a high-dimensional vector embedding. For example, vector database system 905 implements dynamic embedding generation workflows that automatically convert textual content, document structures, and user behavior patterns into high-dimensional vector representations while maintaining embedding versioning, model updates, and consistency management across different AI model deployments and training iterations. In some embodiments, vector database system 905 provides semantic similarity search capabilities that enable intelligent consultant-project matching based on conceptual understanding rather than exact keyword matches, identifying consultants whose experience and skills align with project requirements even when described using different terminology or industry-specific language.

In an embodiment, vector database system 905 implements recommendation algorithms that utilize collaborative filtering, content-based filtering, and hybrid approaches through vector similarity calculations to suggest relevant opportunities, potential collaborations, and strategic partnerships based on historical success patterns and semantic content analysis. Vector database system 905 maintains embedding metadata including, but not limited to, model provenance, generation timestamps, confidence scores, and semantic categories that enable embedding quality assessment, model performance tracking, and intelligent routing of similarity queries to optimal embedding spaces based on query types and accuracy requirements.

The data persistence architecture implements coordinated data management workflows that optimize performance, reliability, and analytical capabilities across all applicable specialized database systems while maintaining data consistency and enabling comprehensive marketplace intelligence enhanced by artificial intelligence capabilities. Primary database system 901 serves as the authoritative source for transactional data and provides structured content to vector database system 905 for semantic embedding generation while supplying consistent data feeds to analytics database system 902 for performance monitoring and to document store system 903 for content indexing. Analytics database system 902 processes performance metrics to inform caching strategies in cache layer system 904 and provides user behavior data to vector database system 905 for personalized recommendation model training and optimization. Document store system 903 supplies textual content and multimedia data to vector database system 905 for embedding generation while integrating with cache layer system 904 for optimized content retrieval and providing metadata to primary database system 901 for relational consistency. Cache layer system 904 coordinates with all database systems for data freshness and performance optimization while providing real-time access to frequently requested embeddings and similarity search results from vector database system 905. Vector database system 905 enhances all other systems by providing semantic search capabilities to document store system 903, intelligent analytics insights to analytics database system 902, personalized caching strategies to cache layer system 904, and AI-powered matching recommendations to primary database system 901 for improved marketplace functionality.

Figure 10:
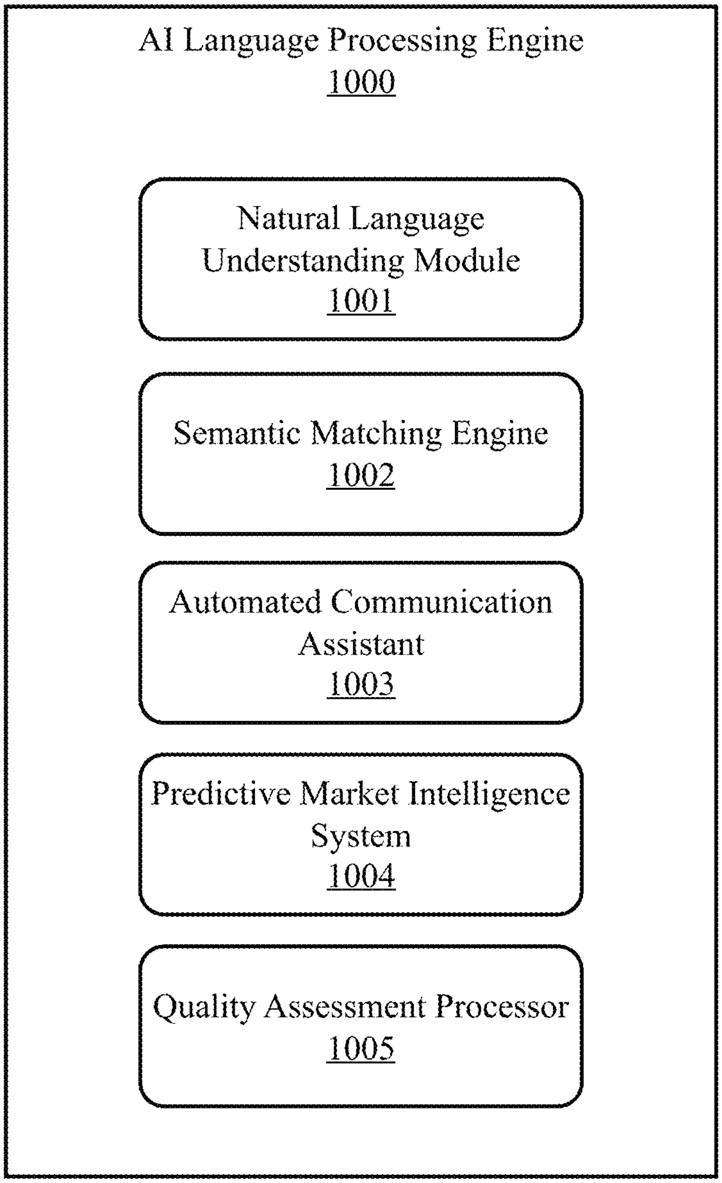
FIG. 10 is a block diagram illustrating an exemplary aspect of the labor arbitrage marketplace system, an AI language processing engine.

FIG. 10 is a block diagram illustrating an exemplary aspect of the labor arbitrage marketplace system, an AI language processing engine. According to an embodiment, AI language processing engine 1000 comprises various specialized artificial intelligence modules that provide advanced natural language understanding, semantic analysis, and intelligent automation capabilities specifically optimized for labor arbitrage marketplace operations and consultant-client matching workflows. In some implementations, AI language processing engine may be configured as a subcomponent of resource planning engine 200 or dynamic marketplace core interface 300

A natural language understanding module 1001 may be present and configured to implement advanced text processing and semantic comprehension capabilities that enable the marketplace platform to interpret unstructured content including project descriptions, consultant portfolios, client requirements, and communication exchanges through sophisticated language models fine-tuned for professional services terminology. According to an aspect of an embodiment, natural language understanding module 1001 utilizes large language models including, but not limited to, GPT-4, Llama, and domain-specific transformer architectures that have been fine-tuned on professional services datasets including, for example, consulting project descriptions, technical specifications, skill taxonomies, and industry-specific terminology to achieve superior comprehension accuracy for marketplace content analysis. Natural language understanding module 1001 may implement named entity recognition algorithms that automatically identify and extract key information elements including required skills, technology platforms, industry domains, project timelines, budget ranges, team size requirements, and geographic constraints from unstructured text while maintaining contextual understanding and relationship mapping between extracted entities. Natural language understanding module 1001 can process multi-language content through advanced translation and localization capabilities that enable global marketplace participation while preserving technical accuracy and cultural context in consultant profiles, project requirements, and communication workflows across multiple languages and regional dialects. Natural language understanding module 1001 can implement intent classification algorithms that analyze user queries, project requests, and consultant applications to determine underlying objectives including resource search intent, availability inquiries, proposal requests, and relationship-building communications while providing confidence scoring and ambiguity resolution for complex or unclear requests. Natural language understanding module 1001 maintains continuous learning capabilities that improve comprehension accuracy through feedback analysis, successful match outcomes, and domain expert annotations while implementing model versioning and A/B testing frameworks that ensure consistent performance improvement without disrupting marketplace operations.

According to an embodiment, a semantic matching engine 1002 leverages advanced natural language processing and machine learning algorithms to identify optimal consultant-project pairings based on conceptual understanding and contextual similarity rather than traditional keyword-based matching approaches. Semantic matching engine 1002 can be configured to provide contextual skill analysis that evaluates consultant experience descriptions against project requirements using semantic similarity algorithms that understand relationships between related technologies, methodologies, and industry practices even when described using different terminology or abstraction levels. Semantic matching engine 1002 processes experience relevance scoring through deep learning models that analyze consultant project histories, achievement descriptions, and skill demonstrations to calculate alignment scores with specific client requirements while considering factors including, but not limited to, project complexity, domain expertise depth, and transferable skill applicability. Semantic matching engine 1002 may implement collaborative compatibility assessment that analyzes consultant personality profiles, communication styles, and working preferences against client culture descriptions and team dynamics requirements using natural language analysis of previous project feedback and collaboration success patterns. Semantic matching engine 1002 can provide explainable matching recommendations that generate natural language explanations for why specific consultants are recommended for particular projects, including detailed analysis of skill alignment, experience relevance, and collaborative fit factors while maintaining transparency and enabling human oversight of automated matching decisions. Semantic matching engine 1002 implements dynamic matching optimization that continuously refines matching algorithms based on project outcome feedback, client satisfaction scores, and consultant performance metrics while utilizing reinforcement learning techniques that improve matching accuracy through marketplace interaction data and successful engagement patterns.

An automated communication assistant 1003 provides intelligent communication support that enhances marketplace interactions through natural language generation, proposal automation, and negotiation assistance while maintaining professional communication standards and personalization capabilities. In some embodiments, automated communication assistant 1003 implements proposal generation algorithms that create customized project proposals by analyzing client requirements, consultant capabilities, and market pricing data to generate compelling, accurate, and professionally formatted proposals that highlight relevant experience and value propositions while maintaining consultant voice and communication style preferences. Automated communication assistant 1003 can provide negotiation support through intelligent contract term suggestions that analyze project requirements, market conditions, and historical negotiation outcomes to recommend optimal pricing strategies, milestone structures, and engagement terms while identifying potential negotiation leverage points and risk factors for both consultants and clients. Automated communication assistant 1003 may implement real-time communication enhancement that provides writing assistance, tone optimization, and cultural sensitivity guidance for consultant-client interactions while offering translation services and terminology standardization that ensures clear communication across diverse professional backgrounds and language preferences. Automated communication assistant 1003 maintains conversation context awareness that tracks ongoing discussions, project requirements evolution, and relationship development to provide contextually relevant communication suggestions while preserving conversation history and enabling seamless handoffs between automated assistance and human communication when needed. Automated communication assistant 1003 provides automated follow-up management that generates appropriate follow-up communications based on engagement stage, response patterns, and relationship status while scheduling reminders and tracking communication effectiveness to optimize engagement success rates and relationship development.

A predictive market intelligence system 1004 analyzes marketplace data, industry trends, and external information sources to generate actionable insights about skill demand, pricing optimization, and strategic opportunities for marketplace participants through advanced analytics and forecasting capabilities. Predictive market intelligence system 1004 implements skill demand forecasting that analyzes job market trends, technology adoption patterns, industry transformation indicators, and marketplace transaction data to predict future demand for specific skills and competencies while providing confidence intervals and trend analysis that enable proactive consultant development and strategic positioning. Predictive market intelligence system 1004 can process pricing optimization analytics that evaluate market rates, project complexity factors, consultant expertise levels, and competitive positioning to generate dynamic pricing recommendations that maximize revenue opportunities while maintaining market competitiveness and client satisfaction across different engagement types and market conditions. Predictive market intelligence system 1004 can provide market opportunity identification through analysis of emerging technologies, industry disruption patterns, client expansion indicators, and competitive landscape changes to identify new service opportunities and market gaps that consultants and firms can capitalize on for strategic growth and differentiation. Predictive market intelligence system 1004 implements client behavior analysis that processes communication patterns, engagement histories, project outcomes, and satisfaction metrics to predict client needs, expansion opportunities, and retention risks while providing personalized relationship management recommendations and early warning indicators for potential issues. Predictive market intelligence system 1004 maintains competitive intelligence capabilities that monitor marketplace activity, pricing trends, consultant movements, and client preferences to provide strategic insights about competitive positioning and market dynamics while identifying opportunities for service differentiation and market expansion.

A quality assessment processor 1005 may be present and configured to implement comprehensive evaluation and validation capabilities that enhance marketplace quality standards through intelligent analysis of consultant qualifications, project fit assessment, and performance prediction using natural language processing and machine learning techniques. In an embodiment, quality assessment processor 1005 utilizes automated resume analysis that processes consultant portfolios, experience descriptions, and skill claims through natural language understanding algorithms that validate qualifications, identify potential inconsistencies, and assess skill levels based on project descriptions and achievement narratives while cross-referencing claims against industry standards and certification requirements. Quality assessment processor 1005 can be configured to support intelligent interview generation that creates customized assessment questions based on specific project requirements and consultant backgrounds while utilizing natural language generation to produce relevant technical scenarios, behavioral interview questions, and skill demonstration exercises that accurately evaluate consultant capabilities and project fit. Quality assessment processor 1005 can provide performance prediction algorithms that analyze consultant experience patterns, project outcome histories, client feedback narratives, and skill development trajectories to forecast success probability for specific engagements while identifying potential risk factors and recommending mitigation strategies for challenging assignments. Quality assessment processor 1005 maintains fraud detection capabilities that identify suspicious patterns in consultant profiles, experience claims, and credential presentations through anomaly detection algorithms and natural language analysis while implementing verification workflows that ensure marketplace integrity and participant authenticity. Quality assessment processor 1005 implements continuous quality monitoring that tracks consultant performance across multiple engagements while analyzing client feedback, project outcomes, and skill development to maintain dynamic quality scores and provide personalized improvement recommendations that enhance consultant capabilities and marketplace value.

AI language processing engine 1000 implements sophisticated integration workflows that coordinate natural language processing capabilities across various specialized modules while maintaining seamless interaction with other marketplace platform components for comprehensive intelligent automation. Natural language understanding module 1001 provides semantic content analysis to semantic matching engine 1002 for improved matching accuracy and supplies structured data extraction to quality assessment processor 1005 for qualification validation while feeding language comprehension insights to automated communication assistant 1003 for enhanced communication generation. Semantic matching engine 1002 communicates matching algorithms and success patterns to predictive market intelligence system 1004 for market trend analysis and provides matching outcome data to quality assessment processor 1005 for performance prediction refinement while supplying semantic similarity data to natural language understanding module 1001 for continuous learning optimization. Automated communication assistant 1003 shares communication effectiveness metrics with predictive market intelligence system 1004 for market behavior analysis and provides negotiation outcome data to quality assessment processor 1005 for success factor identification while utilizing semantic understanding from natural language understanding module 1001 for contextually appropriate communication generation. Predictive market intelligence system 1004 distributes market insights and demand forecasts to all other modules for strategic optimization while providing competitive intelligence to semantic matching engine 1002 for algorithm refinement and supplying trend analysis to automated communication assistant 1003 for market-aware communication strategies. Quality assessment processor 1005 provides quality metrics and validation results to all other modules for performance optimization while communicating assessment outcomes to semantic matching engine 1002 for matching quality improvement and supplying quality standards to automated communication assistant 1003 for professional communication maintenance.

Detailed Description of Exemplary Aspects

The methods and processes described herein are illustrative examples and should not be construed as limiting the scope or applicability of the labor arbitrage marketplace platform. These exemplary implementations serve to demonstrate the versatility and adaptability of the platform. It is important to note that the described methods may be executed with varying numbers of steps, potentially including additional steps not explicitly outlined or omitting certain described steps, while still maintaining core functionality. The modular and flexible nature of the labor arbitrage marketplace platform allows for numerous alternative implementations and variations tailored to specific use cases or technological environments. As the field evolves, it is anticipated that novel methods and applications will emerge, leveraging the fundamental principles and components of the platform in innovative ways. Therefore, the examples provided should be viewed as a foundation upon which further innovations can be built, rather than an exhaustive representation of the platform's capabilities.

Figure 11:
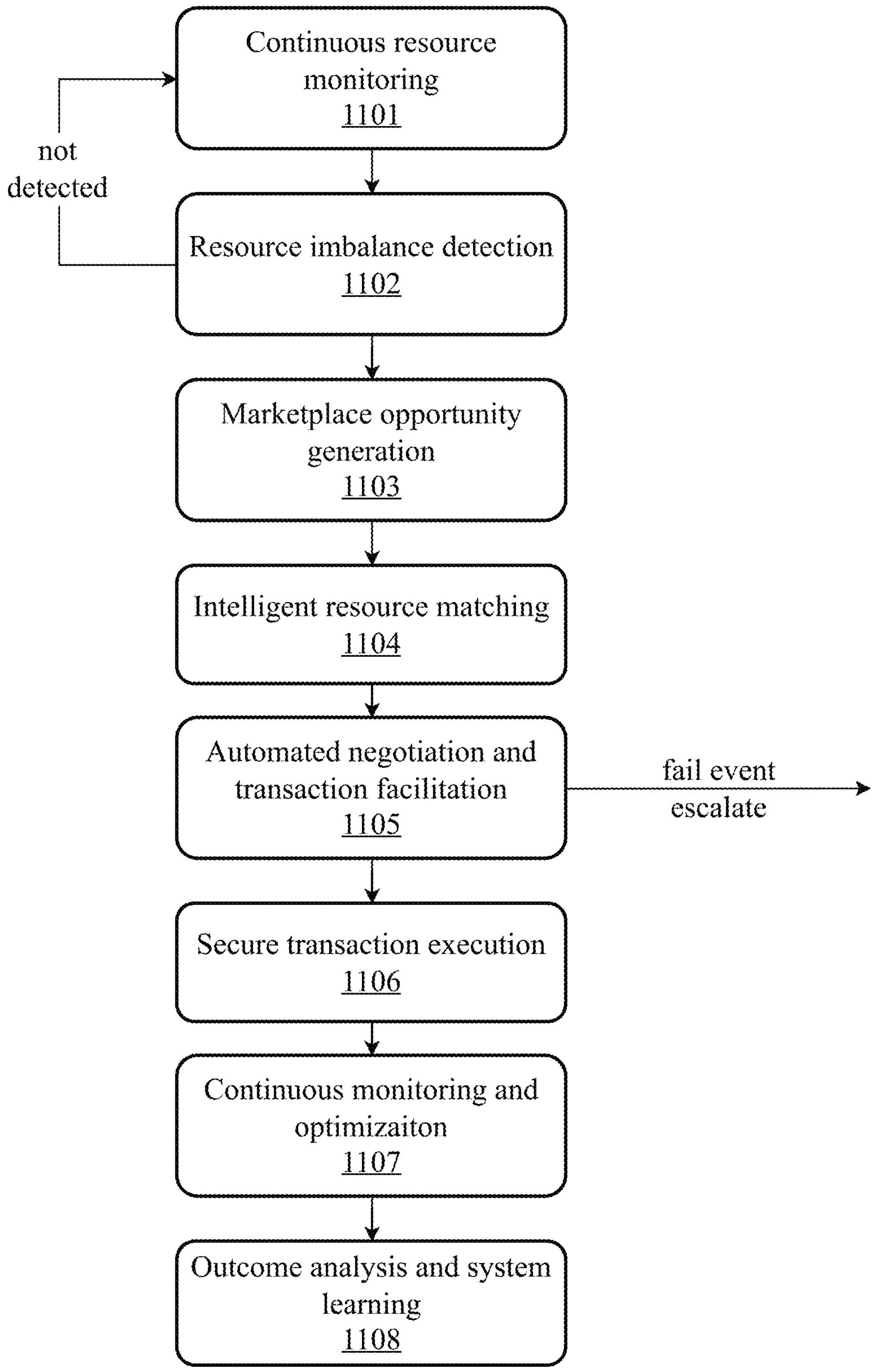
FIG. 11 is a flow diagram illustrating an exemplary resource arbitrage method, according to an embodiment.

FIG. 11 is a flow diagram illustrating an exemplary resource arbitrage method, according to an embodiment. The resource arbitrage method enables automated detection of resource imbalances across multiple professional services organizations and facilitates intelligent resource sharing transactions through marketplace-mediated arbitrage processes.

According to the embodiment, the process begins at step 1101 with continuous monitoring of resource utilization patterns across multiple participating professional services firms through data ingestion layer 100 that collects real-time capacity data, project assignments, consultant availability, and organizational demand forecasts from integrated firm management systems. The monitoring process implements automated threshold analysis that evaluates utilization rates against predefined optimal ranges while identifying firms approaching understaffed conditions with utilization exceeding capacity or overstaffed conditions with significant unused consultant capacity.

At step 1102, the method implements resource imbalance detection through resource planning engine 200 that processes collected utilization data using multi-dimensional allocation matrix 201 and capacity optimization engine 204 to identify specific resource gaps and surplus conditions. The detection process analyzes imbalances across multiple organizational dimensions including, but not limited to, skill categories, practice areas, geographic regions, and temporal availability windows while calculating severity scores that prioritize critical imbalances requiring immediate marketplace intervention versus routine capacity variations within acceptable operational ranges.

Upon detecting resource imbalances, the method proceeds to step 1103 where marketplace opportunity generation is initiated through dynamic marketplace core 300 that creates resource requests for understaffed situations and resource offerings for overstaffed conditions. For understaffed firms, supply-demand matching engine 301 generates detailed resource requirements including skill specifications, timeline constraints, budget parameters, and preference criteria while enabling firms to specify urgency levels and alternative resource configurations. For overstaffed firms, bid/offer processing system 302 creates resource availability offerings that include consultant profiles, availability windows, rate ranges, and engagement preferences while providing options for individual consultant placement or team-based resource packages.

The method continues to step 1104 with intelligent resource matching where AI language processing engine 1000 enhances traditional matching algorithms through semantic matching engine 1002 that analyzes resource requirements and consultant capabilities using natural language understanding and contextual similarity rather than keyword-based matching. The matching process may incorporate preference management system 400 filters that apply vendor relationship preferences, individual consultant preferences, and collaborative fit analysis while utilizing vetting and credentialing engine 500 validation data to ensure quality standards and marketplace integrity throughout the matching process.

At step 1105, the method implements automated negotiation and transaction facilitation through bid/offer processing system 302 and transaction management system 303 that coordinate pricing negotiations, contract term optimization, and agreement finalization between requesting and supplying organizations. In some embodiments, the negotiation process utilizes automated communication assistant 1003 to generate proposal content, optimize pricing strategies based on predictive market intelligence system 1004 insights, and facilitate contract discussions while maintaining transparency and fairness for all marketplace participants through standardized negotiation protocols and audit trail maintenance.

The method proceeds to step 1106 with secure transaction execution where transaction management system 303 implements escrow services, contract generation, and payment processing to complete resource arbitrage transactions while ensuring financial security and legal compliance for all participating parties. The execution process may comprise automated contract generation based on negotiated terms, milestone-based payment scheduling aligned with project deliverables, and comprehensive documentation that supports dispute resolution and compliance requirements throughout the engagement lifecycle.

At step 1107, the method implements continuous monitoring and optimization through analytics database system 902 and marketplace analytics system 304 that track project outcomes, participant satisfaction, financial performance, and marketplace efficiency metrics to evaluate arbitrage transaction success and identify optimization opportunities. The monitoring process can analyze consultant performance, client satisfaction, project completion rates, and relationship development outcomes while utilizing this feedback to improve future matching algorithms, pricing strategies, and marketplace policies through machine learning optimization and best practice identification.

The method concludes at step 1108 with outcome analysis and system learning where AI language processing engine 1000 and preference management system 400 process transaction results and participant feedback to enhance future arbitrage operations through predictive market intelligence system 1004 trend analysis, semantic matching engine 1002 algorithm refinement, and automated performance tracking module 404 preference optimization. The learning process can implement continuous improvement algorithms that adjust matching criteria, pricing models, and negotiation strategies based on successful transaction patterns while maintaining system performance and participant satisfaction through iterative optimization and feedback integration.

In various embodiments, the resource arbitrage method implements decision logic at multiple steps that enable adaptive process execution based on marketplace conditions and participant requirements. At step 1102, if no significant resource imbalances are detected, the method returns to step 1101 for continued monitoring while maintaining alert systems for threshold breaches. At step 1104, if initial matching results are insufficient, the method implements expanded search criteria and alternative matching strategies before proceeding to negotiation phases. At step 1105, if automated negotiation fails to reach agreement, the method escalates to human-assisted negotiation workflows while maintaining automated support and documentation capabilities. Throughout the entire process, the method maintains exception handling and fallback procedures that ensure marketplace continuity and participant satisfaction even during system stress conditions or unusual market circumstances.

Figure 12:
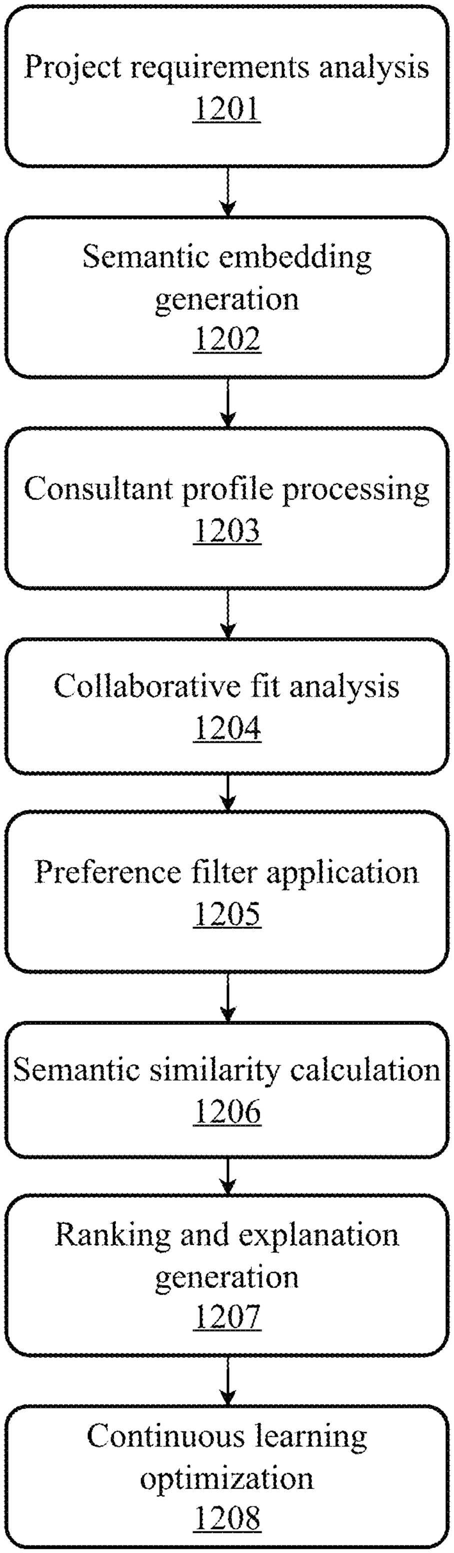
FIG. 12 is a flow diagram illustrating an exemplary method for intelligent consultant-project matching, according to an embodiment.

FIG. 12 is a flow diagram illustrating an exemplary method for intelligent consultant-project matching, according to an embodiment. The intelligent matching method leverages artificial intelligence, semantic analysis, and collaborative fit assessment to identify optimal consultant-project pairings that maximize success probability beyond traditional keyword-based matching approaches.

According to the embodiment, the process begins at step 1201 with project requirement analysis where natural language understanding module 1001 processes unstructured project descriptions, client specifications, and engagement parameters to extract structured requirement data including, but not limited to, technical skills, industry expertise, project complexity, timeline constraints, budget parameters, team composition needs, and cultural fit requirements. The analysis process may implement named entity recognition algorithms that identify specific technologies, methodologies, certifications, and domain knowledge while parsing temporal expressions for project timelines and extracting quantitative parameters including, for instance, budget ranges, team sizes, and performance metrics that inform matching optimization algorithms.

At step 1202, the method implements semantic embedding generation where vector database system 905 (or a similar embedding engine) creates high-dimensional vector representations of project requirements using large language models that capture contextual meaning and conceptual relationships beyond surface-level keyword matching. The embedding process can utilize domain-specific transformer models fine-tuned on professional services data to generate embeddings that understand industry terminology, skill relationships, and project complexity patterns while maintaining embedding versioning and consistency management across different model deployments and training iterations.

The method continues to step 1203 with consultant profile processing where document store system 903 and natural language understanding module 1001 analyze consultant portfolios, experience descriptions, skill certifications, and project histories to create comprehensive capability profiles that capture both explicit qualifications and implicit expertise indicators. The processing may comprise automated resume analysis that validates skill claims through project description analysis, identifies expertise depth through achievement narratives, and extracts transferable skills through semantic understanding of diverse project experiences while maintaining profile currency through continuous updates and validation workflows.

At step 1204, the method implements collaborative fit analysis through multi-dimensional allocation matrix 201 and individual preference profiles system 402 that evaluate interpersonal compatibility between consultants and client environments using, for example, personality assessment data, communication style preferences, working methodology alignment, and historical collaboration success patterns. The analysis process incorporates client culture descriptions, team dynamics requirements, and consultant collaboration preferences while utilizing machine learning algorithms trained on (in some embodiments) successful engagement outcomes to predict collaborative effectiveness and identify potential compatibility challenges that could impact project success.

The method proceeds to step 1205 with preference filter application where automated filtering engine 403 applies organizational vendor preferences, individual consultant preferences, and client-specific requirements to narrow the candidate pool while maintaining quality standards and strategic relationship priorities. The filtering process may implement hierarchical preference application that first applies organizational constraints including preferred vendor relationships, geographic requirements, security clearances, and budget limitations before proceeding to individual-level preferences including, but not limited to, consultant availability, rate preferences, project type interests, and engagement duration preferences while providing override capabilities for exceptional circumstances.

At step 1206, the method implements semantic similarity calculation where semantic matching engine 1002 computes compatibility scores between project requirements and consultant capabilities using vector similarity algorithms, contextual analysis, and/or weighted scoring models that consider (the non-limiting) skill alignment, experience relevance, availability overlap, and collaborative fit factors. In various embodiments, the calculation process utilizes multiple similarity metrics including, but not limited to, cosine similarity for semantic alignment, weighted scoring for quantitative factors, and compatibility matrices for collaborative assessment while generating confidence scores and uncertainty measures that inform matching quality assessment and recommendation ranking.

The method continues to step 1207 with ranking and explanation generation where semantic matching engine 1002 and automated communication assistant 1003 create prioritized consultant recommendations with natural language explanations that detail why specific consultants are optimal matches for particular projects. The ranking process may consider multiple optimization objectives including, but not limited to, technical skill alignment, collaborative compatibility, cost effectiveness, availability matching, and strategic relationship value while generating transparent explanations that enable human oversight and validation of automated matching decisions through detailed rationale and supporting evidence presentation.

At step 1208, the method implements continuous learning optimization where performance tracking module 404 and quality assessment processor 1005 analyze matching outcomes, project success rates, client satisfaction scores, and consultant performance metrics (and/or the like) to refine matching algorithms and improve future recommendation accuracy. In some implementations, the learning process utilizes reinforcement learning techniques that adjust matching weights based on successful outcome patterns while implementing A/B testing frameworks that validate algorithm improvements and maintain matching quality standards through controlled experimentation and statistical validation of performance improvements.

The intelligent matching method may comprise adaptive decision logic that enables dynamic process adjustment based on matching quality and availability constraints. At step 1203, if insufficient consultant profiles meet basic requirements, the method can implement expanded search criteria including related skills, transferable experience, and alternative qualification pathways while maintaining quality thresholds. At step 1205, if preference filtering results in too few candidates, the method may provide relaxed preference options and alternative matching strategies while maintaining visibility into preference compliance trade-offs. At step 1206, if semantic similarity scores fall below confidence thresholds (which may be set by a user or system process, and which may be dynamic in implementation, depending upon the embodiment), the method may trigger expanded analysis including alternative interpretation of requirements and consultant capabilities while providing uncertainty indicators and recommendation confidence levels.

According to an embodiment, the method implements quality assurance checkpoints throughout the matching process that validate recommendation quality and ensure marketplace integrity. At step 1204, collaborative fit analysis may comprise bias detection algorithms that identify potential discrimination factors and ensure fair matching practices while maintaining legal compliance and ethical standards. At step 1207, explanation generation may comprise consistency validation that ensures recommendation rationale aligns with stated matching criteria while providing audit trails for dispute resolution and quality improvement analysis. The entire matching process maintains comprehensive logging and performance metrics that enable continuous quality monitoring and rapid identification of matching accuracy degradation or system performance issues that could impact marketplace effectiveness and participant satisfaction.

Figure 13:
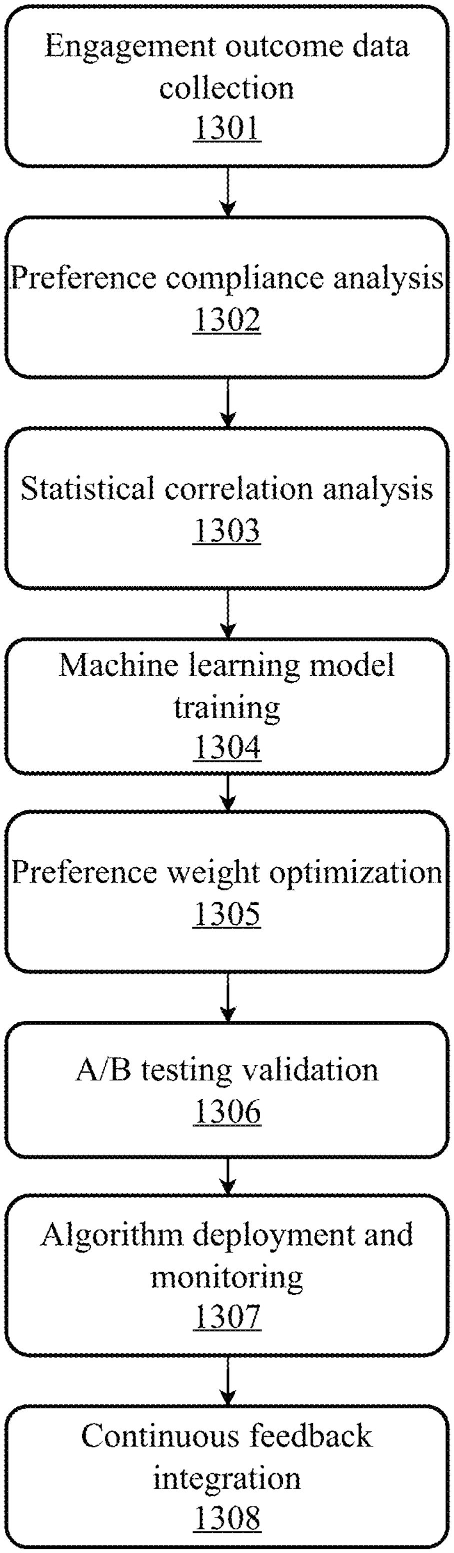
FIG. 13 is a flow diagram illustrating an exemplary dynamic preference learning method, according to an embodiment.

FIG. 13 is a flow diagram illustrating an exemplary dynamic preference learning method, according to an embodiment. The dynamic preference learning method enables continuous optimization of matching algorithms through systematic analysis of engagement outcomes and automated adjustment of preference weights to improve future matching accuracy and participant satisfaction.

According to the embodiment, the process begins at step 1301 with engagement outcome data collection where analytics database system 902 and performance tracking module 404 systematically gather comprehensive data from completed marketplace transactions including, but not limited to, project success metrics, client satisfaction scores, consultant performance ratings, timeline adherence, budget compliance, deliverable quality assessments, and relationship development indicators. In some aspects, the data collection process implements automated feedback solicitation workflows that capture structured ratings and unstructured comments from all engagement participants while maintaining response rate optimization through strategic timing, personalized communication, and incentive mechanisms that encourage comprehensive feedback provision without survey fatigue or response bias.

At step 1302, the method implements preference compliance analysis where automated filtering engine 403 and performance tracking module 404 correlate initial preference settings with actual engagement outcomes to identify patterns between preference adherence and project success across multiple dimensions including, for example, vendor relationship compliance, consultant preference satisfaction, client requirement fulfillment, and collaborative fit alignment. The analysis process may examine preference violation impacts on project outcomes while identifying cases where preference overrides resulted in successful engagements, enabling nuanced understanding of preference importance and flexibility opportunities that inform algorithm optimization strategies.

The method continues to step 1303 with statistical correlation analysis where predictive market intelligence system 1004 and quality assessment processor 1005 apply advanced statistical techniques including, but not limited to, regression analysis, correlation coefficient calculation, and multivariate analysis to identify significant relationships between preference compliance levels and engagement success indicators. The correlation analysis may comprise multiple statistical methodologies including Pearson correlation for linear relationships, Spearman correlation for non-linear associations, and partial correlation analysis that controls for confounding variables while utilizing statistical significance testing and confidence interval calculation to ensure reliable pattern identification and avoid spurious correlations that could mislead optimization algorithms.

At step 1304, the method implements machine learning model training where semantic matching engine 1002 and quality assessment processor 1005 develop predictive models that forecast engagement success probability based on preference compliance patterns using supervised learning algorithms including gradient boosting, random forest, and neural network architectures. In some implementations, the model training process utilizes cross-validation techniques to prevent overfitting while implementing feature engineering that creates derived variables representing preference interaction effects and temporal patterns that enhance predictive accuracy beyond simple preference compliance scoring through sophisticated pattern recognition and relationship modeling.

The method proceeds to step 1305 with preference weight optimization where performance tracking module 404 and automated filtering engine 403 systematically adjust preference importance scores and filtering thresholds based on correlation analysis results and machine learning model insights to maximize predicted engagement success rates. The optimization process may comprise multi-objective optimization algorithms that balance competing goals including, but not limited to, maximizing project success probability, maintaining participant satisfaction, preserving strategic relationships, and ensuring fairness across different consultant and client categories while utilizing constraint satisfaction techniques that maintain minimum acceptable standards for critical preference categories.

At step 1306, the method implements A/B testing validation where marketplace analytics system 304 and semantic matching engine 1002 deploy optimized preference algorithms to controlled subsets of marketplace participants while maintaining comparison groups using original preference settings to validate improvement effectiveness through statistical analysis of outcome differences. The A/B testing process implements rigorous experimental design including randomization protocols, sample size calculation, and statistical power analysis while maintaining ethical considerations and participant consent for algorithm experimentation that ensures valid comparison results without compromising marketplace integrity or participant experience.

The method continues to step 1307 with algorithm deployment and monitoring where automated filtering engine 403 and performance tracking module 404 implement validated preference optimizations across the entire marketplace platform while establishing continuous monitoring systems that track algorithm performance and detect degradation or unexpected behavior patterns. The deployment process may comprise gradual rollout procedures that enable rapid rollback if performance issues arise while implementing real-time monitoring dashboards that provide visibility into algorithm effectiveness, preference compliance rates, and engagement success metrics that inform ongoing optimization and maintenance activities.

At step 1308, the method implements continuous feedback integration where the entire preference learning system establishes perpetual optimization cycles that incorporate new engagement outcome data into ongoing algorithm refinement while maintaining historical performance tracking and trend analysis that inform strategic algorithm development and marketplace evolution. In some aspects, the feedback integration process implements automated trigger mechanisms that initiate new optimization cycles when performance thresholds are exceeded or significant market changes are detected while maintaining algorithm stability and preventing excessive optimization frequency that could destabilize marketplace performance or confuse participants with frequent preference changes.

According to various embodiments, the dynamic preference learning method incorporates sophisticated decision logic that enables adaptive optimization based on, for instance, data quality and statistical significance requirements. At step 1302, if insufficient engagement outcome data is available for reliable analysis, the method can implement extended data collection periods and alternative data source integration while maintaining minimum statistical sample requirements for valid pattern identification. At step 1305, if optimization results suggest conflicting preference adjustments, the method may implement conflict resolution algorithms that prioritize optimization objectives based on marketplace strategic goals while providing transparent reporting of trade-off decisions and their expected impact on different participant categories.

The method may comprise comprehensive quality assurance mechanisms that ensure preference learning integrity and prevent algorithmic bias or discrimination. At step 1303, statistical analysis may include bias detection protocols that identify preference patterns that could result in unfair treatment of particular consultant or client categories while implementing corrective measures that maintain fairness and legal compliance. At step 1306, A/B testing validation can include ethical review processes that ensure experimental designs do not disadvantage particular participant groups while maintaining informed consent and transparent communication about algorithm optimization activities that affect marketplace participant experiences and outcomes.

Figure 14:
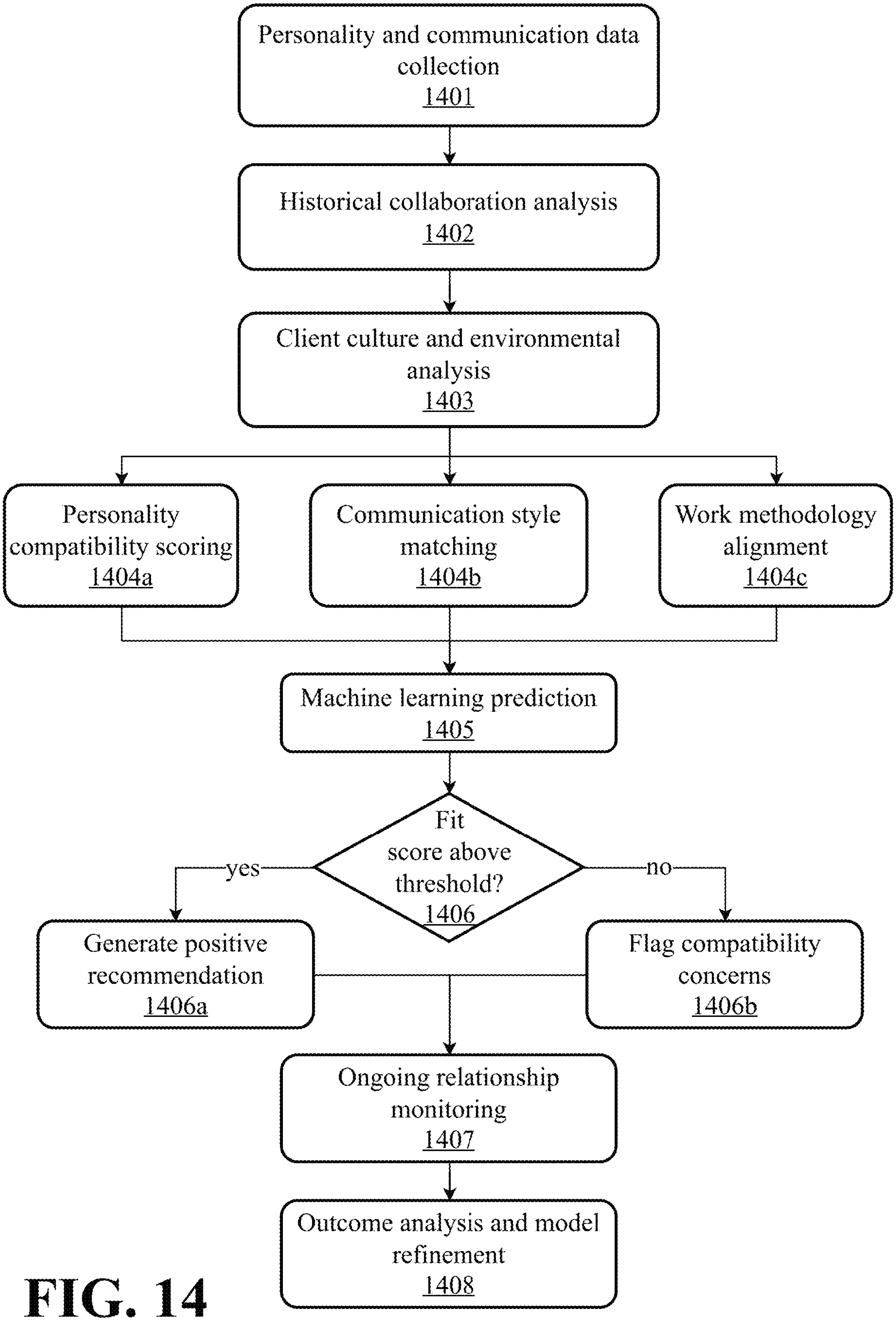
FIG. 14 is a flow diagram illustrating an exemplary collaborative fit assessment method, according to an embodiment.

FIG. 14 is a flow diagram illustrating an exemplary collaborative fit assessment method, according to an embodiment. The collaborative fit assessment method evaluates interpersonal compatibility between consultants and client environments through comprehensive analysis of personality factors, communication styles, work methodologies, and historical collaboration patterns to predict engagement success probability and optimize team dynamics.

According to the embodiment, the process begins at step 1401 with personality and communication data collection where individual preference profiles system 402 and quality assessment processor 1005 gather comprehensive psychological and behavioral assessment data including, for example, Myers-Briggs Type Indicator results, DISC personality assessments, emotional intelligence scores, communication style preferences, conflict resolution approaches, and leadership style compatibility indicators from both consultants and client organizational representatives. In an aspect, the data collection process can implement standardized assessment protocols that ensure consistent measurement across all marketplace participants while maintaining assessment validity through certified testing instruments and professional interpretation services that provide reliable psychological profiling for compatibility analysis and team optimization algorithms.

At step 1402, the method implements historical collaboration analysis where performance tracking module 404 and analytics database system 902 process engagement outcome data from previous consultant-client interactions including, but not limited to, project success rates, team satisfaction scores, conflict frequency, resolution effectiveness, and relationship development patterns to identify successful collaboration indicators and problematic interaction patterns. The analysis process may examine collaboration success across different personality combinations, communication style pairings, and team composition scenarios while utilizing machine learning algorithms trained on successful engagement outcomes to identify subtle patterns that predict collaborative effectiveness beyond surface-level compatibility assessments.

The method continues to step 1403 with client culture and environment analysis where natural language understanding module 1001 and document store system 903 analyze organizational culture descriptions, team dynamics requirements, communication norms, decision-making processes, and work environment characteristics to create comprehensive client culture profiles that inform compatibility assessments. The analysis process may comprise automated extraction of cultural indicators from client communications, project descriptions, and organizational materials while incorporating feedback from previous consultant engagements to build detailed environmental profiles that capture both explicit cultural requirements and implicit behavioral expectations that impact consultant integration success.

According to the embodiment, the method implements parallel compatibility assessment processing through a plurality of specialized analysis streams that evaluate different aspects of collaborative fit simultaneously. Step 1404*a* performs personality compatibility scoring where semantic matching engine 1002 analyzes consultant and client personality profiles to identify complementary traits, potential conflict areas, and optimal personality combinations based on, for instance, psychological compatibility research and historical marketplace success patterns. Step 1404*b* conducts communication style matching where automated filtering engine 403 evaluates alignment between consultant communication preferences and client organizational communication norms including directness levels, feedback styles, meeting preferences, and information sharing approaches. Step 1404*c* implements work methodology alignment assessment where multi-dimensional allocation matrix 201 analyzes compatibility between consultant working approaches and client project management styles, including, but not limited to, process preferences, collaboration tools, reporting structures, and quality assurance methodologies.

The method proceeds to step 1405 with machine learning prediction model application where semantic matching engine 1002 and quality assessment processor 1005 utilize trained algorithms to calculate overall collaborative fit scores by integrating personality compatibility, communication alignment, and methodology matching results with historical success patterns and risk factor identification. In some aspects, the prediction model implements ensemble learning techniques that combine multiple assessment dimensions while generating confidence scores and uncertainty measures that indicate prediction reliability and identify cases requiring additional human evaluation or risk mitigation strategies before engagement approval.

At decision point 1406, the method implements conditional recommendation generation based on collaborative fit assessment results. If fit scores exceed predetermined thresholds, step 1406*a* generates positive recommendations that may comprise detailed fit analysis explanations, identified success factors, and optimization suggestions for maximizing collaborative effectiveness throughout the engagement. If fit scores fall below acceptable thresholds, step 1406*b* flags compatibility concerns while providing risk mitigation strategies, alternative consultant options, and/or team support recommendations that could improve collaborative success probability through additional resources or modified engagement structures.

The method continues to step 1407 with ongoing relationship monitoring where performance tracking module 404 and analytics database system 902 implement continuous assessment of consultant-client collaborative effectiveness through periodic satisfaction surveys, performance milestone evaluations, and early warning systems that detect emerging compatibility issues before they impact project success. The monitoring process may include automated trigger mechanisms that initiate intervention protocols when collaboration metrics decline below acceptable levels while providing coaching resources and mediation services that address compatibility challenges and preserve engagement success through proactive relationship management.

At step 1408, the method implements outcome analysis and model refinement where the collaborative fit assessment system processes engagement completion data to analyze correlation between initial fit predictions and actual collaboration outcomes while utilizing this feedback to improve future assessment accuracy through algorithm optimization and predictive model updates. The refinement process can implement continuous learning algorithms that adjust compatibility weighting factors, improve personality matching criteria, and enhance risk prediction capabilities based on successful engagement patterns while maintaining assessment validity and preventing overfitting to specific organizational or consultant types.

According to the embodiment, the collaborative fit assessment method incorporates sophisticated decision logic that enables adaptive assessment based on data availability and assessment confidence levels. At step 1401, if comprehensive personality assessment data is unavailable, the method may implement alternative assessment approaches including, but not limited to, behavioral interview analysis, work style questionnaires, and peer reference evaluation while maintaining minimum assessment standards for reliable compatibility prediction. At step 1405, if machine learning prediction confidence falls below acceptable thresholds, the method may trigger enhanced assessment protocols including expert human evaluation and extended compatibility analysis while providing uncertainty indicators and risk warnings for engagement decision-making.

According to an embodiment, the method includes comprehensive bias prevention and ethical compliance mechanisms throughout the assessment process. At step 1402, historical collaboration analysis implements bias detection algorithms that identify potentially discriminatory patterns in collaboration success metrics while ensuring fair assessment across diverse consultant and client populations. At step 1406, recommendation generation may further comprise fairness validation protocols that prevent systematic bias against particular personality types or communication styles while maintaining legal compliance with employment and discrimination regulations that govern professional services marketplace operations.

Figure 15:
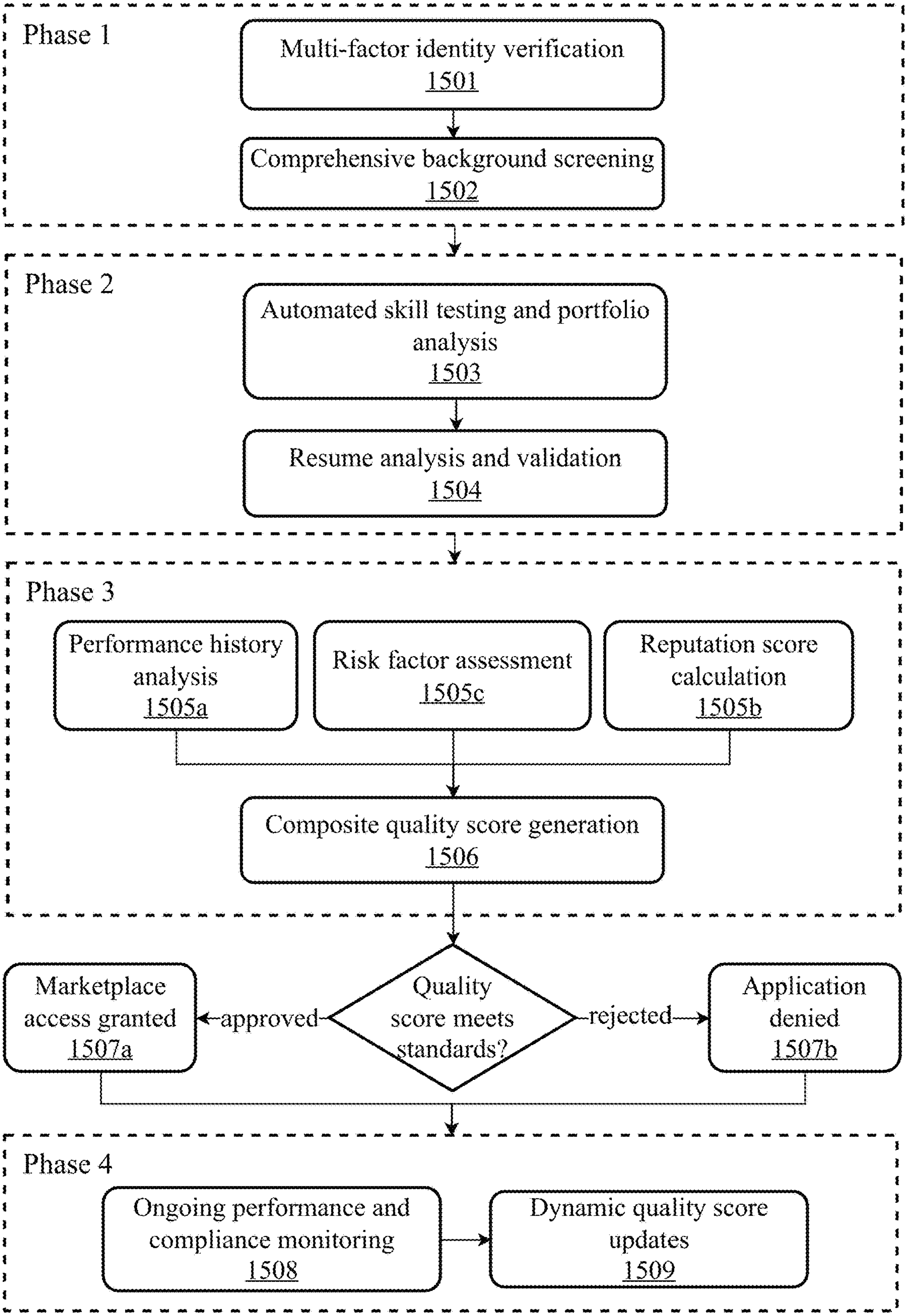
FIG. 15 is a flow diagram illustrating an exemplary automated vetting and quality assurance method, according to an embodiment.

FIG. 15 is a flow diagram illustrating an exemplary automated vetting and quality assurance method, according to an embodiment. The automated vetting method implements comprehensive validation protocols that ensure marketplace participant qualifications through multi-phase verification, assessment, scoring, and continuous monitoring processes while maintaining security standards and quality integrity across all marketplace transactions.

According to an embodiment, the process begins with Phase 1 identity verification and background checks, starting at step 1501 with multi-factor identity verification where identity verification system 501 implements comprehensive authentication protocols including, but not limited to, government-issued document verification through optical character recognition and authenticity validation, biometric verification using facial recognition and fingerprint scanning technologies, government database cross-referencing for identity confirmation, and voice recognition analysis for behavioral biometric validation. The verification process may utilize machine learning algorithms trained on document forgery detection while implementing liveness detection protocols that prevent spoofing attacks and ensure authentic identity presentation through advanced anti-fraud technologies and real-time verification procedures.

At step 1502, the method implements comprehensive background screening where identity verification system 501 coordinates with professional background check services to conduct criminal history verification across multiple jurisdictions, employment history validation through direct employer contact and database verification, educational credential confirmation through institution verification and degree authentication services, professional licensing verification through regulatory body confirmation, credit history assessment for financial responsibility evaluation, and professional reference validation through structured interview processes and performance verification protocols. The background screening process may implement risk scoring algorithms that evaluate potential red flags while maintaining compliance with applicable employment laws and privacy regulations across multiple jurisdictions.

Phase 2 focuses on skill assessment and certification validation, beginning at step 1503 with automated skill testing and portfolio analysis where skill assessment platform 502 conducts, in some embodiments, standardized technical assessments across relevant professional domains using adaptive testing algorithms that adjust question difficulty based on performance levels, comprehensive portfolio review through automated content analysis and project evaluation, certification validation through direct integration with professional certification databases, and practical skill demonstrations through simulated client scenarios and hands-on problem-solving exercises. The assessment process may implement anti-cheating technologies including proctoring systems and behavioral analysis while maintaining assessment validity through regular test content updates and statistical analysis of assessment effectiveness.

At step 1504, the method implements AI-powered resume analysis and validation where quality assessment processor 1005 and natural language understanding module 1001 perform automated consistency checking that identifies potential discrepancies in employment dates, skill claims, and achievement descriptions, skill claim validation through cross-referencing with assessment results and portfolio evidence, achievement verification through quantitative analysis and external validation where possible, and comprehensive experience analysis that evaluates career progression patterns and identifies potential credibility issues through machine learning algorithms trained on authentic professional profiles.

Phase 3 implements quality scoring and risk assessment through parallel processing streams. Step 1505*a* performs performance history analysis where performance tracking module 404 evaluates past project outcomes including success rates, client satisfaction scores, and deliverable quality across multiple engagements while analyzing performance patterns and improvement trends. Step 1505*b* conducts reputation score calculation where reputation management system 505 processes peer reviews, industry recognition indicators, and professional network analysis to generate comprehensive reputation profiles based on professional community feedback and recognition patterns. Step 1505*c* implements risk factor assessment where quality assessment processor 1005 applies fraud detection algorithms that identify suspicious patterns, inconsistency analysis that flags potential credibility issues, and comprehensive red flag detection that evaluates multiple risk indicators including behavioral anomalies and credential discrepancies.

At step 1506, the method implements composite quality score generation where quality scoring algorithm 503 integrates results from all assessment phases using weighted scoring models that balance technical competency, professional experience, background verification results, and risk factor analysis to generate comprehensive quality profiles with confidence intervals and reliability indicators. The scoring process may implement statistical normalization techniques that ensure fair comparison across different consultant backgrounds while providing transparent scoring rationale and uncertainty measures that inform marketplace matching decisions and client selection processes.

According to an embodiment, the method includes a decision point where composite quality scores are evaluated against predetermined marketplace standards. If scores meet acceptance thresholds, step 1507*a* grants marketplace access through one or more of profile activation, quality badge assignment based on assessment results, and match eligibility configuration that enables participation in marketplace transactions with appropriate quality indicators. If scores fall below acceptance standards, step 1507*b* implements application denial with detailed feedback provision that explains assessment results, improvement recommendations that guide qualification enhancement, and structured re-application processes that enable future marketplace participation after addressing identified deficiencies.

Phase 4 implements continuous monitoring and re-evaluation beginning at step 1508 with ongoing performance and compliance monitoring where compliance monitoring system 504 and performance tracking module 404 maintain real-time performance tracking across active engagements, compliance alert systems that identify potential regulatory or quality issues, quality maintenance protocols that ensure continued marketplace standards adherence, and periodic re-assessment procedures that validate ongoing qualification and performance standards through systematic evaluation cycles.

At step 1509, the method implements dynamic quality score updates where quality scoring algorithm 503 performs performance-based score adjustments that reflect recent engagement outcomes and performance trends, client feedback integration that incorporates satisfaction scores and detailed performance evaluations into ongoing quality assessments, and market positioning updates that adjust consultant rankings and visibility based on demonstrated performance and client demand patterns while maintaining fairness and transparency in quality score evolution.

According to an embodiment, the method implements system learning and algorithm optimization where the entire vetting system analyzes vetting accuracy through correlation analysis between initial assessments and subsequent performance outcomes, implements false positive and negative reduction strategies that improve assessment precision and reduce inappropriate approvals or rejections, and enhances predictive models through machine learning optimization that improves future assessment accuracy based on marketplace outcome patterns and participant success indicators.

The automated vetting method may comprise decision logic that enables adaptive processing based on assessment complexity and risk levels. At step 1502, if standard background checks reveal potential issues, the method may implement enhanced verification procedures including additional reference checks and specialized investigation protocols while maintaining procedural fairness and legal compliance. At step 1504, if AI analysis identifies significant credibility concerns, the method can trigger human expert review and additional verification procedures while providing transparency about assessment rationale and appeal processes for disputed evaluations.

According to an aspect, the method comprises extensive quality assurance and bias prevention mechanisms throughout the vetting process. At step 1505, parallel assessment streams may include bias detection protocols that identify potentially discriminatory evaluation patterns and ensure fair assessment across diverse participant populations. At step 1506, composite scoring may comprise algorithmic fairness validation that prevents systematic bias against particular demographic groups while maintaining legal compliance with anti-discrimination regulations and marketplace diversity objectives that promote inclusive participation and equitable opportunity access.

Figure 16:
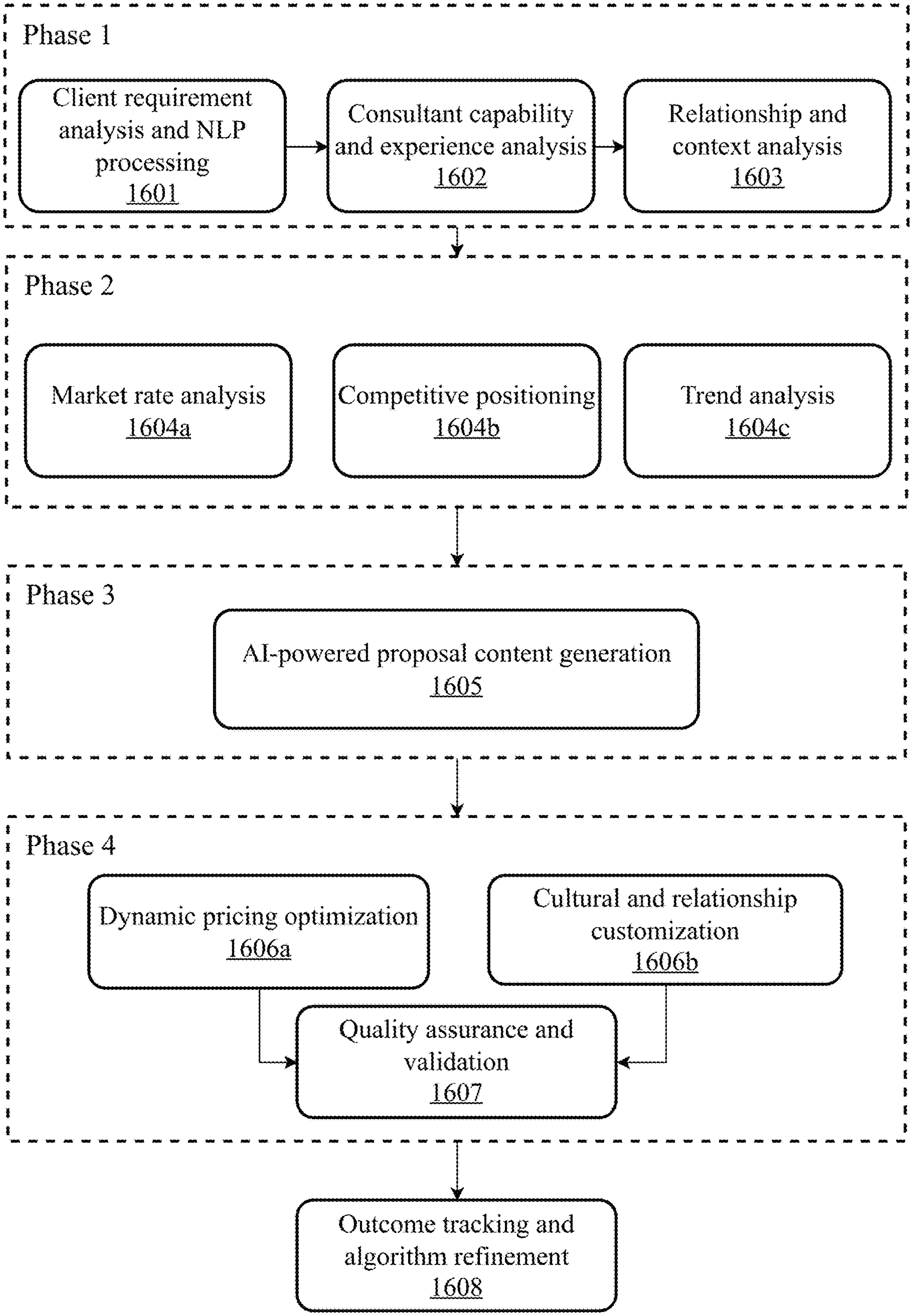
FIG. 16 is a flow diagram illustrating an exemplary AI-powered proposal generation method, according to an embodiment.

FIG. 16 is a flow diagram illustrating an exemplary AI-powered proposal generation method, according to an embodiment. The AI-powered proposal generation method leverages advanced natural language processing, market intelligence, and machine learning algorithms to automatically create compelling, customized, and competitively positioned proposals that maximize engagement success probability while maintaining consultant authenticity and client relationship optimization.

According to the embodiment, the process begins with Phase 1 comprehensive requirement and capability analysis, starting at step 1601 with client requirement analysis and NLP processing where natural language understanding module 1001 processes unstructured client communications including, but not limited to, project descriptions, technical specifications, budget parameters, timeline constraints, team composition requirements, cultural preferences, success criteria definitions, and risk tolerance indicators to extract structured requirement data that informs proposal generation algorithms. The analysis process can implement advanced named entity recognition that identifies specific technologies, methodologies, deliverable types, and performance metrics while utilizing semantic understanding to capture implicit requirements and unstated expectations that influence proposal effectiveness and client satisfaction.

At step 1602, the method implements consultant capability and experience analysis where quality assessment processor 1005 and document store system 903 process comprehensive consultant profiles including technical skill inventories, project history analysis, industry experience documentation, professional certifications, quantified success metrics, client testimonial analysis, collaboration style assessment, and current availability status to create detailed capability profiles that enable precise requirement-capability matching and value proposition development. The analysis process can utilize machine learning algorithms trained on successful engagement patterns to identify relevant experience indicators and transferable skills that align with client requirements while maintaining consultant authenticity and credibility.

The method continues at step 1603 with relationship and context analysis where individual preference profiles system 402 and performance tracking module 404 analyze client interaction history including previous engagement outcomes, communication preferences, decision-making patterns, organizational culture indicators, and relationship development stages to inform proposal personalization and strategic positioning strategies. The context analysis incorporates client feedback patterns, satisfaction trends, and engagement evolution to optimize proposal messaging and presentation approaches that align with established relationship dynamics and communication preferences.

Phase 2 implements market intelligence and competitive analysis through parallel processing streams. Step 1604*a* performs market rate analysis where predictive market intelligence system 1004 evaluates industry pricing benchmarks, regional rate variations, skill-specific premium calculations, and current market demand indicators to establish competitive pricing baselines and optimization opportunities. Step 1604*b* conducts competitive positioning analysis where marketplace analytics system 304 assesses alternative solution providers, competitor capability analysis, value differentiation opportunities, and market gap identification to inform unique value proposition development and competitive advantage messaging. Step 1604*c* implements trend analysis where predictive market intelligence system 1004 evaluates emerging technology trends, industry evolution patterns, future demand projections, and strategic alignment opportunities to position proposals within broader market context and demonstrate forward-thinking strategic value.

Phase 3 focuses on large language model content generation at step 1605 where automated communication assistant 1003 integrates with AI language processing engine 1000 to generate comprehensive proposal content including, for instance, executive summaries that articulate value propositions and key client benefits, detailed technical approach descriptions that explain methodologies and implementation strategies, project timeline specifications with milestone definitions and deliverable schedules, resource allocation plans that detail team composition and capability deployment, and comprehensive risk management strategies that address potential challenges and mitigation approaches. In an embodiment, the content generation process utilizes domain-specific transformer models fine-tuned on successful consulting proposals while implementing style adaptation algorithms that maintain consultant voice authenticity and align with client communication preferences and industry standards.

Phase 4 implements pricing optimization and cultural customization through parallel processing streams. Step 1606*a* performs dynamic pricing optimization where bid/offer processing system 302 and predictive market intelligence system 1004 analyze market rate data, project complexity factors, timeline urgency indicators, and relationship value metrics to generate optimal pricing strategies that balance competitiveness with profitability while considering client budget constraints and value perception thresholds. Step 1606*b* conducts cultural and relationship customization where automated communication assistant 1003 adapts proposal presentation style, communication tone, formatting preferences, and content organization to align with client cultural norms, organizational preferences, and established relationship patterns while maintaining professional standards and consultant authenticity.

At step 1607, the method implements comprehensive quality assurance and validation where quality assessment processor 1005 performs accuracy verification that validates all factual claims and technical specifications, consistency checking that ensures alignment between different proposal sections and consultant capabilities, compliance review that confirms adherence to legal requirements and industry standards, style verification that maintains appropriate professional tone and formatting standards, and completeness assessment that ensures all client requirements are adequately addressed with sufficient detail and supporting evidence. The quality assurance process may comprise automated error detection and correction recommendations while providing transparency about validation results and confidence levels.

The method generates comprehensive proposal output that may include, but is not limited to, executive summary sections with compelling value propositions and key benefit articulations, detailed technical approach explanations with methodology descriptions and implementation roadmaps, project timeline specifications with milestone definitions and deliverable scheduling, resource allocation plans with team composition details and capability matching, competitive pricing structures with rate justifications and payment term optimization, risk management strategies with mitigation approaches and contingency planning, success metrics definitions with KPI specifications and measurement methodologies, and next steps outlines with engagement process descriptions and timeline expectations.

At step 1608, the method implements outcome tracking and algorithm refinement where the proposal generation system analyzes proposal success rates through acceptance tracking and conversion analysis, processes client feedback through sentiment analysis and improvement identification, identifies win/loss patterns through statistical analysis and pattern recognition, and optimizes LLM fine-tuning through continuous learning algorithms that improve future proposal quality and effectiveness based on marketplace outcome patterns and client satisfaction indicators.

In another embodiment, the AI-powered proposal generation method may further incorporate sophisticated decision logic that enables adaptive content generation based on proposal complexity and relationship context. At step 1601, if client requirements are ambiguous or incomplete, the method may implement clarification request generation and alternative interpretation scenarios while maintaining proposal development momentum through assumption documentation and validation processes. At step 1605, if LLM content generation produces inconsistent or inappropriate content, the method can trigger human review workflows and alternative generation approaches (e.g., prompt engineering) while maintaining quality standards and deadline adherence through escalation protocols and expert intervention capabilities.

The method may further comprise ethical considerations and quality maintenance mechanisms throughout the proposal generation process. For example, at step 1602, consultant capability analysis can include authenticity verification that prevents capability misrepresentation and maintains honest consultant positioning while avoiding overselling or underselling consultant qualifications. At step 1607, quality assurance can include bias detection protocols that identify potentially discriminatory language or unfair competitive positioning while ensuring proposal content maintains ethical standards and promotes fair marketplace competition that benefits all participants through transparent and honest proposal development practices.

Exemplary Computing Environment

Figure 17:
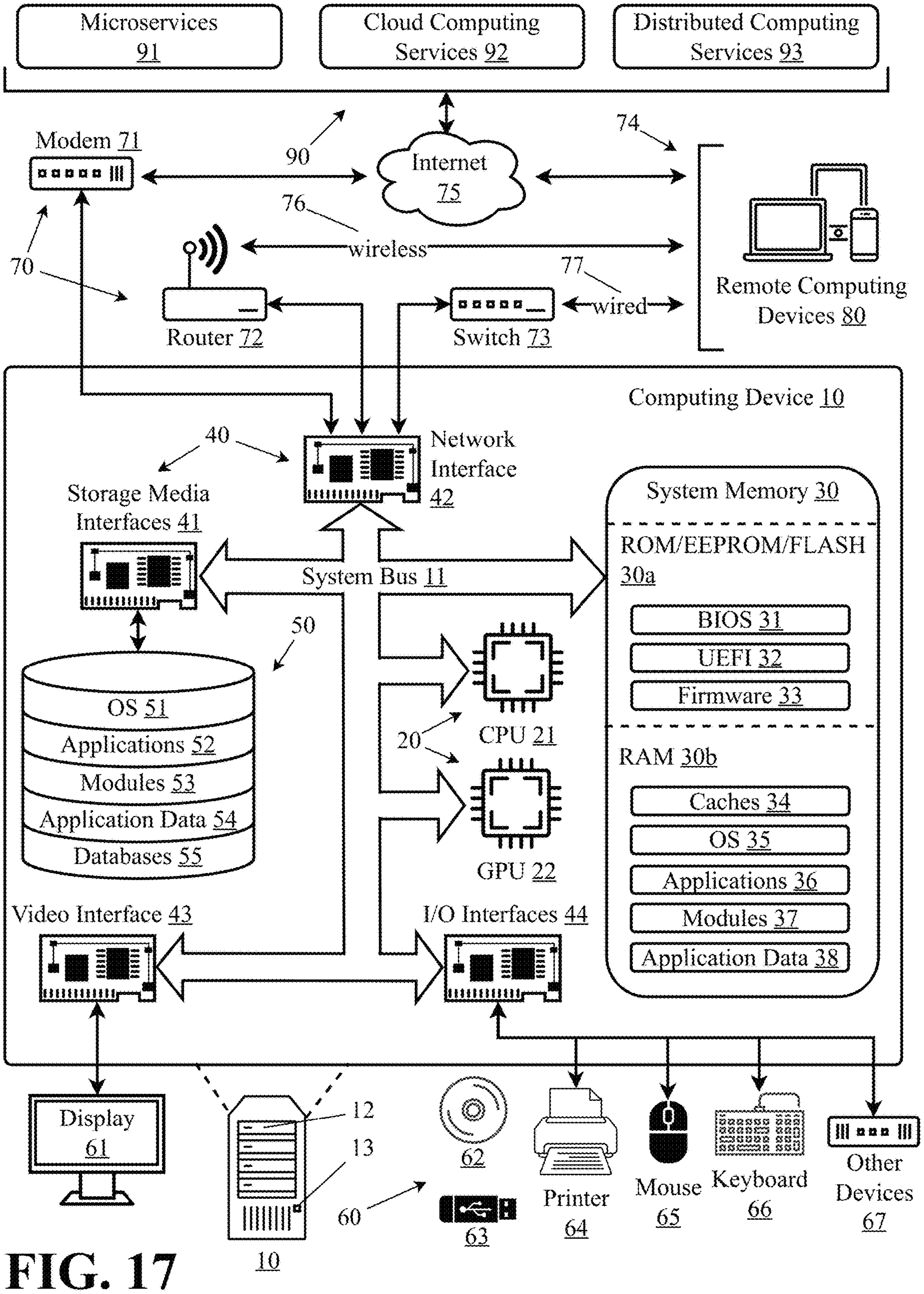
FIG. 17 illustrates an exemplary computing environment on which an embodiment described herein may be implemented.

FIG. 17 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth.

Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer-implemented resource arbitrage marketplace system comprising:
- a processor configured to execute instructions stored in memory;
- a data collection system that receives resource utilization data from multiple participating service provider organizations;
- a resource analysis system that generates probability-weighted demand forecasts for future resource requirements using machine learning algorithms trained on historical project data and sales pipeline analysis, wherein the demand forecasts incorporate sales pipeline data;
- a resource imbalance identification system that processes the demand forecasts and resource utilization data to identify resource imbalances across the participating organizations by analyzing data across multiple organizational hierarchy levels comprising business unit structures;
- a semantic matching system that identifies optimal pairings between resource requests and available capacity, wherein the semantic matching system:
  - generates high-dimensional vector embeddings of resource profiles and requirement specifications using a large language model fine-tuned on professional services terminology;
  - stores the vector embeddings in a specialized vector database configured for similarity search operations using Hierarchical Navigable Small World graph indexing algorithms;
  - performs cosine similarity calculations on the vector embeddings to identify semantic relationships that extend beyond keyword-based matching; and
  - performs a collaborative fit analysis for consultant-client pairings by processing personality assessment data, communication style compatibility metrics, and historical collaboration success patterns, wherein collaborative compatibility scores generated by the collaborative fit analysis are combined with the cosine similarity calculations to identify the optimal pairings;
- a preference learning system that correlates engagement outcome data from completed marketplace transactions with preference settings applied during matching to identify patterns between preference compliance and engagement success, and automatically adjusts preference weights applied by the semantic matching system based on the identified patterns; and
- a transaction system that facilitates automated resource exchanges between the participating organizations, wherein the transaction system implements AI-based contract validation comprising automated verification of deliverables and timesheets using natural language processing to extract and validate contractual obligations;
- wherein the marketplace system maintains data isolation between the participating organizations while enabling secure information sharing for marketplace operations.

2. The system of claim 1, wherein the semantic analysis comprises generating high-dimensional vector embeddings of the resource profiles and requirement specifications and performing similarity calculations on the vector embeddings.

3. The system of claim 1, wherein the resource imbalance identification system analyzes data across multiple organizational hierarchy levels.

4. The system of claim 1, wherein the matching system applies preference criteria comprising organizational vendor relationships and individual resource preferences to filter potential matches using multi-criteria optimization algorithms.

5. The system of claim 1, wherein the transaction system implements automated escrow services and contract generation and validation based on negotiated terms between the participating organizations, wherein contract validation comprises AI-based verification of deliverables and timesheets.

6. The system of claim 1, further comprising a quality assessment system that validates resource credentials and maintains performance scoring based on transaction outcomes.

7. The system of claim 1, wherein the data collection system receives the resource utilization data in real-time through standardized communication interfaces.

8. The system of claim 1, further comprising a natural language processing system that extracts structured data from unstructured resource descriptions and requirements.

9. The system of claim 1, wherein the system maintains data isolation between participating organizations while enabling secure information sharing for marketplace operations.

10. The system of claim 1, wherein the matching system continuously learns from transaction outcomes to improve future matching accuracy.

11. A computer-implemented method for resource arbitrage in a marketplace comprising the steps of:
- collecting resource utilization data from multiple participating service provider organizations;
- generating probability-weighted demand forecasts for future resource requirements using a demand forecasting module comprising machine learning algorithms trained on historical project data and sales pipeline analysis, wherein the demand forecasts incorporate sales pipeline data;
- processing, by a resource imbalance identification system, the demand forecasts and resource utilization data to identify resource imbalances across the participating organizations by analyzing data across multiple organizational hierarchy levels comprising business unit structures;
- identifying optimal pairings between resource requests and available capacity using a semantic matching system, wherein the identifying comprises:
  - generating high-dimensional vector embeddings of resource profiles and requirement specifications using a large language model fine-tuned on professional services terminology;
  - storing the vector embeddings in a specialized vector database configured for similarity search operations using Hierarchical Navigable Small World graph indexing algorithms; and
  - performing cosine similarity calculations on the vector embeddings to identify semantic relationships between resource capabilities; and performing a collaborative fit analysis for consultant-client pairings by processing personality assessment data, communication style compatibility metrics, and historical collaboration success patterns, wherein collaborative compatibility scores generated by the collaborative fit analysis are combined with the cosine similarity calculations to identify the optimal pairings;

correlating, by a preference learning system, engagement outcome data from completed marketplace transactions with preference settings applied during matching to identify patterns between preference compliance and engagement success, and automatically adjusting preference weights applied during future matching based on the identified patterns; and facilitating automated resource exchanges between the participating organizations using a transaction system, wherein the facilitating comprises implementing AI-based contract validation comprising automated verification of deliverables and timesheets using natural language processing to extract and validate contractual obligations;

wherein the marketplace maintains data isolation between the participating organizations while enabling secure information sharing for marketplace operations.

12. The method of claim 11, wherein the semantic analysis comprises generating high-dimensional vector embeddings of the resource profiles and requirement specifications and performing similarity calculations on the vector embeddings.

13. The method of claim 11, wherein the resource imbalance identification system analyzes data across multiple organizational hierarchy levels.

14. The method of claim 11, wherein identifying optimal pairings comprises applying preference criteria including organizational vendor relationships and individual resource preferences to filter potential matches using multi-criteria optimization algorithms.

15. The method of claim 11, wherein facilitating automated resource exchanges comprises implementing automated escrow services and validating contracts based on negotiated terms between the participating organizations, wherein contract validation comprises AI-based verification of deliverables and timesheets.

16. The method of claim 11, further comprising validating resource credentials and maintaining performance scoring based on transaction outcomes.

17. The method of claim 11, wherein collecting resource utilization data comprises receiving the data in real-time through standardized communication interfaces.

18. The method of claim 11, further comprising extracting structured data from unstructured resource descriptions and requirements using natural language processing.

19. The method of claim 11, further comprising maintaining data isolation between participating organizations while enabling secure information sharing for marketplace operations.

20. The method of claim 11, further comprising continuously learning from transaction outcomes to improve future matching accuracy.

* * * * *